(12) United States Patent
Kim et al.

(10) Patent No.: US 11,574,115 B2
(45) Date of Patent: Feb. 7, 2023

(54) METHOD OF PROCESSING ANALOG DATA AND ELECTRONIC DEVICE THEREOF

(71) Applicant: Samsung Electronics Co., Ltd., Gyeonggi-do (KR)

(72) Inventors: Seon-Hwa Kim, Seoul (KR); Kyung-Hwa Kim, Seoul (KR); Jo-Ah Choi, Seoul (KR); Hee-Jin Kim, Seoul (KR); Mi-Jung Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/204,285

(22) Filed: Mar. 17, 2021

(65) Prior Publication Data

US 2021/0200935 A1 Jul. 1, 2021

Related U.S. Application Data

(63) Continuation of application No. 16/173,437, filed on Oct. 29, 2018, which is a continuation of application (Continued)

(30) Foreign Application Priority Data

Aug. 29, 2013 (KR) .......................... 10-2013-0103292

(51) Int. Cl.
*G06F 40/151* (2020.01)
*G06F 3/0488* (2022.01)
(Continued)

(52) U.S. Cl.
CPC .......... *G06F 40/151* (2020.01); *G06F 3/0488* (2013.01); *G06V 10/987* (2022.01); *G06V 30/10* (2022.01)

(58) Field of Classification Search
CPC ........ G06F 40/151; G06F 3/0488; G06F 3/01; G06F 3/14; G06K 9/033; G06K 2209/01; G06V 10/987; G06V 30/10; G06V 30/127
(Continued)

(56) References Cited

U.S. PATENT DOCUMENTS

| 5,583,542 A | 12/1996 | Capps |
| 5,606,690 A | 2/1997 | Hunter |

(Continued)

FOREIGN PATENT DOCUMENTS

| EP | 0 700 197 | 3/1996 |
| EP | 1 635 268 | 3/2006 |

(Continued)

OTHER PUBLICATIONS

Michiaki Tatsubori et al., "HTML Templates that Fly", International World Wide Web Conference Committee (IW3C2), Apr. 20-24, 2009, 10 pages.

(Continued)

*Primary Examiner* — Andrew R Dyer
(74) *Attorney, Agent, or Firm* — The Farrell Law Firm, P.C.

(57) ABSTRACT

A method and electronic device are provided for processing data. Analog text included in a document is detected. A first area of the analog text that converts to digital text and a second area of the analog text that does not convert to the digital text are determined. The digital text is displayed in the first area that converts to the digital text, and an image of at least a portion of the analog text is displayed in the second area that does not convert to digital text.

10 Claims, 18 Drawing Sheets

Related U.S. Application Data

No. 14/338,743, filed on Jul. 23, 2014, now abandoned.

(51) Int. Cl.
*G06V 10/98* (2022.01)
*G06V 30/10* (2022.01)

(58) Field of Classification Search
USPC ........................................................ 715/256
See application file for complete search history.

(56) References Cited

U.S. PATENT DOCUMENTS

| | | | |
|---|---|---|---|
| 5,768,418 A | 6/1998 | Berman | |
| 5,889,523 A * | 3/1999 | Wilcox | G06F 3/04845 |
| | | | 715/978 |
| 5,900,876 A | 5/1999 | Yagita | |
| 6,021,218 A | 2/2000 | Capps et al. | |
| 6,651,221 B1 * | 11/2003 | Thompson | G06F 40/166 |
| | | | 715/203 |
| 7,295,708 B2 * | 11/2007 | Chen | G06K 9/00463 |
| | | | 382/181 |
| 7,913,162 B2 * | 3/2011 | Hansen | G06F 16/93 |
| | | | 715/230 |
| 8,508,756 B2 | 8/2013 | Komaki | |
| 2001/0042098 A1 * | 11/2001 | Gupta | G06F 40/169 |
| | | | 709/206 |
| 2003/0018650 A1 * | 1/2003 | Priestley | G06F 16/958 |
| 2003/0214531 A1 | 11/2003 | Chambers | |
| 2004/0078757 A1 * | 4/2004 | Golovchinsky | G06F 40/169 |
| | | | 715/205 |
| 2004/0139391 A1 | 7/2004 | Stumbo et al. | |
| 2004/0143796 A1 * | 7/2004 | Lerner | G06F 40/169 |
| | | | 715/234 |
| 2004/0230886 A1 * | 11/2004 | Livshits | G06F 8/71 |
| | | | 715/229 |
| 2008/0174815 A1 | 7/2008 | Komaki | |
| 2010/0198835 A1 * | 8/2010 | Sorvari | G06F 16/48 |
| | | | 707/748 |
| 2011/0239108 A1 | 9/2011 | Blomquist et al. | |
| 2012/0030564 A1 | 2/2012 | Grigsby | |
| 2012/0185491 A1 * | 7/2012 | Mansfield | G06F 16/00 |
| | | | 707/752 |
| 2013/0050141 A1 | 2/2013 | Park et al. | |
| 2013/0198602 A1 * | 8/2013 | Kokemohr | G06F 40/106 |
| | | | 715/233 |
| 2014/0189593 A1 * | 7/2014 | Kurita | G06F 3/0488 |
| | | | 715/835 |

FOREIGN PATENT DOCUMENTS

| | | |
|---|---|---|
| JP | 2009-543204 | 12/2009 |
| KR | 1020110072818 | 6/2011 |
| WO | WO 94/06241 | 3/1994 |

OTHER PUBLICATIONS

Lincoln Faria da Silva et al., "Automatic Discrimination between Printed and Handwritten Text in Documents", XXII Brazilian Symposium on Computer Graphics and Image Processing, IEEE Computer Society, Oct. 2009, 7 pages.
EP Summons to Attend Oral Proceedings dated Jun. 25, 2021 issued in counterpart application No. 14182238.7-1207, 10 pages.
European Search Report dated Apr. 10, 2015 issued in counterpart application No. 14182238.7-1901, 5 pages.
Korean Notice of Patent Grant dated May 30, 2020 issued in counterpart application No. 10-2013-0103292, 5 pages.
EP Summons to Attend Oral Proceedings dated Aug. 3, 2021 issued in counterpart application No. 14182238.7-1207, 9 pages.
EP Minutes dated Dec. 20, 2021 issued in counterpart application No. 14182238.7-1207, 7 pages.
EP Decision to Refuse dated Jan. 4, 2022 issued in counterpart application No. 14182238.7-1207, 14 pages.

* cited by examiner

METHOD OF PROCESSING ANALOG DATA AND ELECTRONIC DEVICE THEREOF

PRIORITY

This is a Continuation application of U.S. patent application Ser. No. 16/173,437, filed with the United States Patent and Trademark Office on Oct. 29, 2018, which is Continuation application of U.S. patent application Ser. No. 14/338,743, which was filed with the U.S. Patent and Trademark Office on Jul. 23, 2014, and claims priority under 35 U.S.C. § 119(a) to a Korean Patent Application No. 10-2013-0103292, which was filed in the Korean Intellectual Property Office on Aug. 29, 2013, the entire disclosure of each of which is incorporated herein by reference.

BACKGROUND OF THE INVENTION

1. Field of the Invention

The present invention relates generally to a method of processing acquired data and an electronic device thereof, and more particularly, to a method of displaying digital and analog text on an electronic device.

2. Description of the Related Art

An electronic device provides various services such as, for example, a camera function, a data communication function, a moving picture reproduction function, an audio reproduction function, a messenger function, a schedule management function, an alarm function, and an audio communication function. Various programs are used in the electronic device that can utilize these functions.

The electronic device may convert analog text included in an image photographed through a camera, analog text included in an image received through network communication, or analog text included in an image which is stored at a memory to digital text processing.

In converting the analog text to the digital text, the electronic device may be unable to acquire digital text corresponding to the analog text and, as a result, may output information that does not correspond with information displayed in the original document, such as by displaying an error code or digital text, which has was converted incorrectly.

SUMMARY OF THE INVENTION

The present invention has been made to address at least the above problems and/or disadvantages and to provide at least the advantages described below. Accordingly, an aspect of the present invention provides a method of processing data and an electronic device thereof that can provide clear information about a text of an acquired document even when a portion or the entire of a text in which the acquired document includes is not determined to a matching digital text.

Another aspect of the present invention provides a method of processing data and an electronic device thereof that can perform a function of the electronic device without operation of directly manipulating through a text in which handwriting is input to an acquired document.

In accordance with an aspect of the present invention, a method is provided that includes displaying, via a display of the electronic device, an electronic document including an image; identifying, from the electronic document, a plurality of handwritten inputs distinguished from a plurality of text words included in the electronic document; acquiring, from among the plurality of handwritten inputs, first handwritten symbols; identifying, from the electronic document, at least one text word corresponding to each of the first handwritten symbols; and in response to receiving a user input, displaying, via the display, the at least one text word as associated with first digital symbols corresponding to each of the first handwritten symbols, based in order of the first handwritten symbols.

In accordance with another aspect of the present invention, an electronic device is provided that includes a display; and at least one processor coupled to the display, configured to: display, via the display, an electronic document including an image; identify, from the electronic document, a plurality of handwritten inputs distinguished from a plurality of text words included in the electronic document; acquire, from among the plurality of handwritten inputs, first handwritten symbols; identify, from the electronic document, at least one text word corresponding to each of the first handwritten symbols; and in response to receiving a user input, display, via the display, the at least one text word as associated with first digital symbols corresponding to each of the first handwritten symbols, based in order of the first handwritten symbols.

BRIEF DESCRIPTION OF THE DRAWINGS

The above and other aspects, features, and advantages of embodiments of the present invention will be more apparent from the following detailed description when taken in conjunction with the accompanying drawings, in which.

DETAILED DESCRIPTION OF EMBODIMENTS OF THE PRESENT INVENTION

Figure 1:
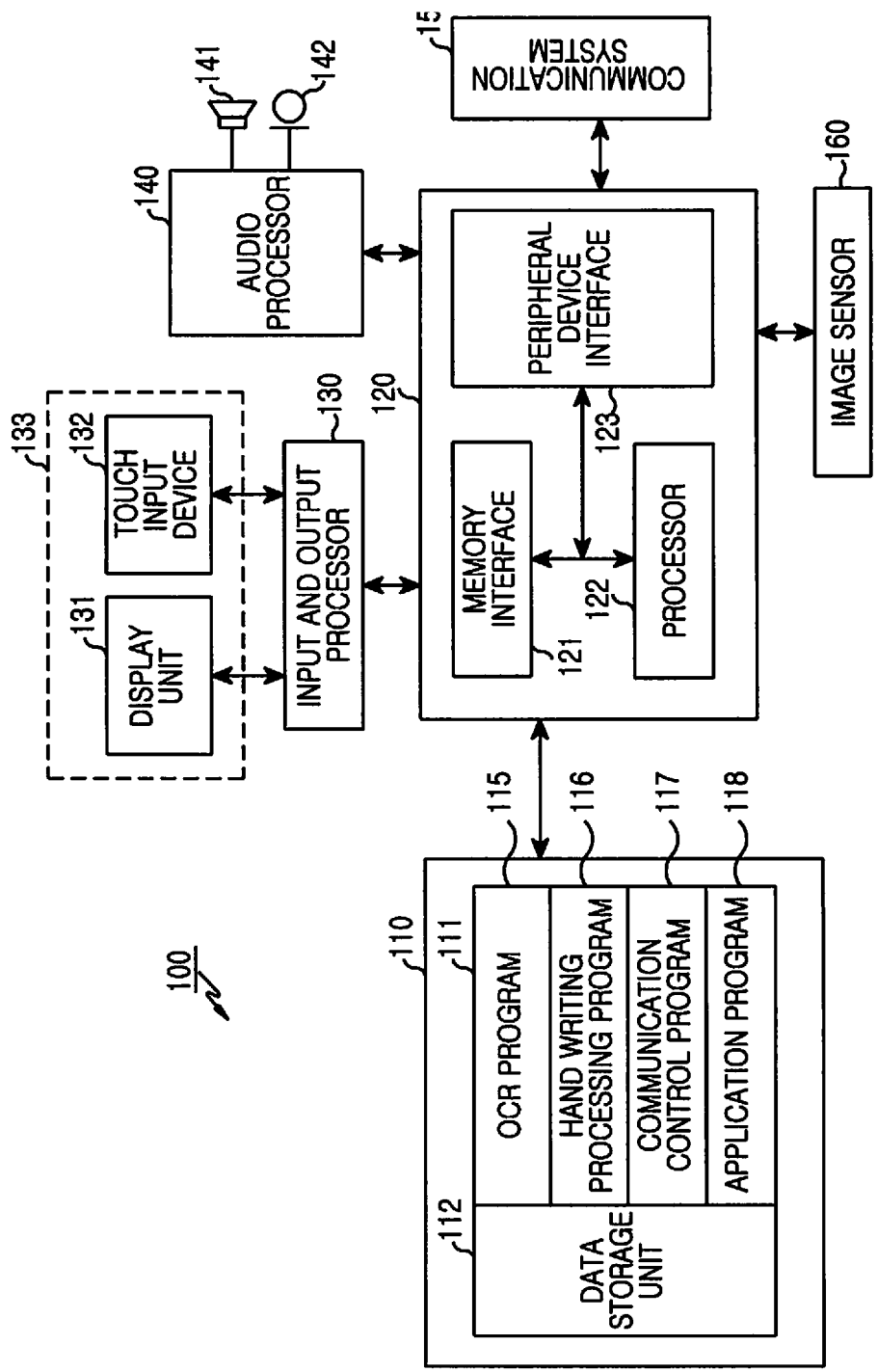
FIG. 1 is a block diagram illustrating a configuration of an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Further, the terms used herein are defined according to the functions of the present invention. Therefore, the terms may vary depending on user's or operator's intention and usage. That is, the terms used herein must be understood based on the descriptions made herein.

When describing various embodiments of the present invention, an electronic device will be described based on a touch screen that can perform an input operation through an input device and a display operation through a display unit on a physical screen. In a device configuration of the present invention, even if a display unit and an input device are separately shown when representing the display unit, the display unit may include the input device, or the input device may be represented with the display unit.

Embodiments of the present invention are not limited only to an electronic device including a touch screen, and may be applied to various electronic devices in which the display unit and the input device are physically separated or that include only one of the display unit and the input device.

An electronic device may be embodied as a mobile communication user device, a Personal Digital Assistant (PDA), a Personal Computer (PC), a laptop computer, a smart phone, a smart pad, a smart television, a Netbook, a Mobile Internet Device (MID), an Ultra Mobile PC (UMPC), a tablet PC, a mobile pad, a media player, a hand-held computer, a navigation device, a smart watch, a Head Mounted Display (HMD), and a Moving Picture Experts Group layer-3 (MP3) player.

When it is described herein that an element is "connected" or "coupled" to another element, it should be understood that the element may be directly connected or coupled to the other element or electrically coupled to the other element through a third element. In contrast, when it is described that an element is "directly connected" or "directly coupled" to another element, it should be understood that there is no intermediate part between the two parts.

FIG. 1 is a block diagram illustrating a configuration of an electronic device, according to an embodiment of the present invention.

As shown in FIG. 1, an electronic device 100 includes a memory 110, a processor unit 120. The electronic device 100 also includes an input and output processor 130, a display unit 131, a touch input device 132, an audio processor 140, a communication system 150 as a peripheral device, and other peripheral devices.

The memory 110 includes a program storage unit 111 that stores a program for controlling operation of the electronic device 100, and a data storage unit 112 that stores data generated while performing a program. The data storage unit 112 may store data generated at a program with operation of a processor 122 of the processor unit 120. According to an embodiment of the present invention, at the data storage unit 112, operation information that can control the electronic device 100 or other electronic devices may be previously determined and a database in a table or list form may be formed and stored. According to an embodiment of the present invention, the electronic device 100 may convert text displayed in document information and acquired by an image sensor 160 to digital text, and store data of the converted digital text as a digital document at the data storage unit 112. According to an embodiment of the present invention, in order to convert text displayed in a document to a digital text, the electronic device 100 may store data of text, such as a character that can compare, a font of the character, a symbol, and a figure, and digital text (a character, a font of the character, a symbol, and a figure) data according to the data of text at the data storage unit 112. According to an embodiment of the present invention, when text displayed in document information, which is acquired by an image sensor, cannot be converted to digital text, the electronic device 100 may store an image of an area that is not converted to digital text as image data at the data storage unit 122.

The program storage unit 111 includes an Optical Character Recognition (OCR) program 115, a handwriting processing program 116, a communication control program 117, and at least one application program 118. Programs included in the program storage unit 111 are formed in a set of instructions and may be represented with an instruction set. The application program 118 may include a software element of at least one application program installed at the memory 110 of the electronic device 100.

The OCR program 115 may convert text information, such as a character, a symbol, and a figure displayed in document information and acquired through the image sensor 160, to digital text and generate a digital document in the same form as, or a form similar to, that of text displayed in a document.

The handwriting processing program 116 may work with the OCR program 115. According to an embodiment of the present invention, the handwriting processing program 116 may convert a symbol input in handwriting to acquired document information, to a digital symbol corresponding to a predetermined method, and apply a function or an effect corresponding to the determined digital symbol to the digital document. The electronic device 100 may output a digital document in which a function or an effect corresponding to a digital symbol is applied.

According to an embodiment of the present invention, when text input in handwriting to acquired document information cannot be converted to digital text, the handwriting processing program 116 may copy text from an area that cannot be converted to digital text to image data, or may crop with a method such as pasting. Cropping may be a method of acquiring a partial area or an entire area of image data. The handwriting processing program 116 may display image data of an area that cannot be converted to digital text at a predetermined position of the digital document.

Acquired document information described in embodiments of the present invention may be a document that includes text information of an analog method that does not include a digital text (e.g., text information of a data form used in the electronic device 100 like image information of a document that is photographed through the image sensor 160 of the electronic device 100 and image information of a document including text stored at a memory of the electronic device 100). The electronic device 100 may detect text from image information of a document and determine digital text matched to the same shape as, or a shape similar to, that of the detected text.

The communication control program 117 may include at least one software element for controlling communication with at least one other electronic device using the communication system 150 or the image sensor 160. According to an embodiment of the present invention, the communication control program 117 may search for another electronic device for a communication connection. When another electronic device for the communication connection is found, the communication control program 117 may set a connection for communication with the other electronic device. Thereafter, by performing a performance search and session setting procedure with the connected other electronic device, the communication control program 117 may control to transmit and receive data (e.g., packet data) to and from the other electronic device through the communication system 150.

The memory 110 included in the electronic device 100 may be one or more memory components. According to an embodiment of the present invention, the memory 110 may perform a function of only the program storage unit 111, a function of only the data storage unit 112, or functions of both the program storage unit 11 and the data storage unit 112 according to use. In the memory 110, a physical area within the memory 110 may not be clearly divided based on the characteristics of the electronic device 100.

The processor unit 120 includes a memory interface 121, at least one processor 122, and a peripheral device interface 123. The memory interface 121, the at least one processor 122, and the peripheral device interface 123 included in the processor unit 120 may be integrated in at least one circuit or may be embodied with a separate constituent elements.

The memory interface 121 may control access to the memory 110 of a constituent element such as the processor 122 or the peripheral device interface 123.

The peripheral device interface 123 may control a connection of an input and output peripheral device, the processor 122, and the memory interface 121 of the electronic device 100.

The processor 122 may control the electronic device 100 to provide various multimedia services using at least one software program and to display a UI operation of the electronic device 100 at the display unit 131 through the input and output processor 130. The processor 122 may also control the touch input device 132 to provide a service that receives input of an instruction from outside of the electronic device 100. By executing at least one program stored at the memory 110, the processor 122 may control to provide a service corresponding to a corresponding program.

The input and output processor 130 may provide an interface between an input and output device 133, such as the display unit 131 and the touch input device 132, and the peripheral device interface 123.

The display unit 131 may receive state information of the electronic device 100, a character, a moving picture, or a still picture input from outside of the processor unit 120. The display unit 131 may form an UI operation, and display the UI operation through the input and output processor 130.

The touch input device 132 may provide input data occurring by a user's selection to the processor unit 120 through the input and output processor 130. According to an embodiment of the present invention, in order to receive data from outside of the electronic device 100, the touch input device 132 may be formed with only a control button or may be formed with a keypad.

According to an embodiment of the present invention, the touch input device 132 may be provided with the input and output device 133 together with the display unit 131 so that an input and output may operate on one screen. The touch input device 132 used for the input and output device 133 may use at least one of a capacitive type, a resistive (pressure detection) type, an infrared ray type, an electromagnetic induction type, and an ultrasonic wave type.

According to an embodiment of the present invention, an input method of the touch input device 132 may be a method of inputting an instruction when an input means is positioned within a predetermined distance from the touch screen 133, in addition to a method of directly touching and inputting the touch screen 133. The input method may use inputs such as a hovering touch, a floating touch, an indirect touch, a proximity touch, or a non-contact input.

The input and output device 133 is a device that physically couples the touch input device 132 as a single screen on the display unit 131. When operating the electronic device 100, the input and output device 133 may be a touch screen that can input an instruction by touching a screen configuration displayed in the display unit 131. The touch screen can perform functions of both the display unit 131 that displays a UI operation of the electronic device 100 and the touch input device 132 that inputs an external instruction to the electronic device 100. Thus, in the following description, the touch screen may be formed as the touch screen 133 including the display unit 131 and the touch input device 132. In an embodiment of the present invention, the touch screen 133 is formed in a complex touch panel in which a touch panel and a pen touch panel are formed together. The touch screen 133 of the electronic device 100 is not limited to a touch panel formed in a complex touch panel, and may be embodied as a touch screen to which a pen touch panel, which can perform only a pen touch, is applied.

The audio processor 140 may provide an audio interface between a user and the electronic device 100 through a speaker 141 and a microphone 142.

The communication system 150 performs a communication function. According to an embodiment of the present invention, the communication system 150 may perform communication with another electronic device using at least one of mobile communication, wire communication, and satellite communication through a base station, and is connected to at least one short range wireless communication module to perform short range wireless communication.

According to an embodiment of the present invention, a short range wireless communication module may perform communication with another electronic device using at least one of short range wireless communication such as, for example, infrared ray communication, Bluetooth communication, Bluetooth Low Energy (BLE) communication, Wi-Fi communication, Near Field Communication (NFC) wireless communication, Zigbee communication, and Ultra Wide-Band (UWB) communication, Wireless Local Area Network (LAN) communication, and wire communication. According to an embodiment of the present invention, the communication system 150 or a short range wireless communication module is divided and described, but the communication system 150 and the short range wireless communication module may perform communication in one communication system module.

The image sensor 160 may photograph an object and generate image data. According to an embodiment of the present invention, the image sensor 160 may include an optical unit and an operation detection sensor (motion sensor), and may be formed with a module such as an operation detection module and a camera module. The optical unit may be driven by a mechanical shutter, a motor, or an actuator, and may perform operations such as a zoom function and focusing by the actuator. The optical unit photographs a peripheral object, and the image sensor 160 may detect an image photographed by the optical unit and convert the detected image to an electrical signal. The image sensor 160 may be embodied as a sensor such as a Complementary Metal-Oxide Semiconductor (CMOS) or a Charge-Coupled Device (CCD), and another image sensor having high resolution may be used. The image sensor of the camera may house a grovel shutter therein. The grovel shutter may perform a function similar to a mechanical shutter housed in a sensor.

In accordance with embodiments of the present invention, a display to the electronic device 100 or an output to the electronic device 100 may be a term representing a method of displaying a moving picture, a still picture, or an GUI operation on the touch screen 133 of the electronic device 100 or outputting a signal sound or a voice to the speaker 141. The term display or output may be used herein, and when it is necessary to distinguish a display or an output, the display or the output may be separately described.

Figure 2A:
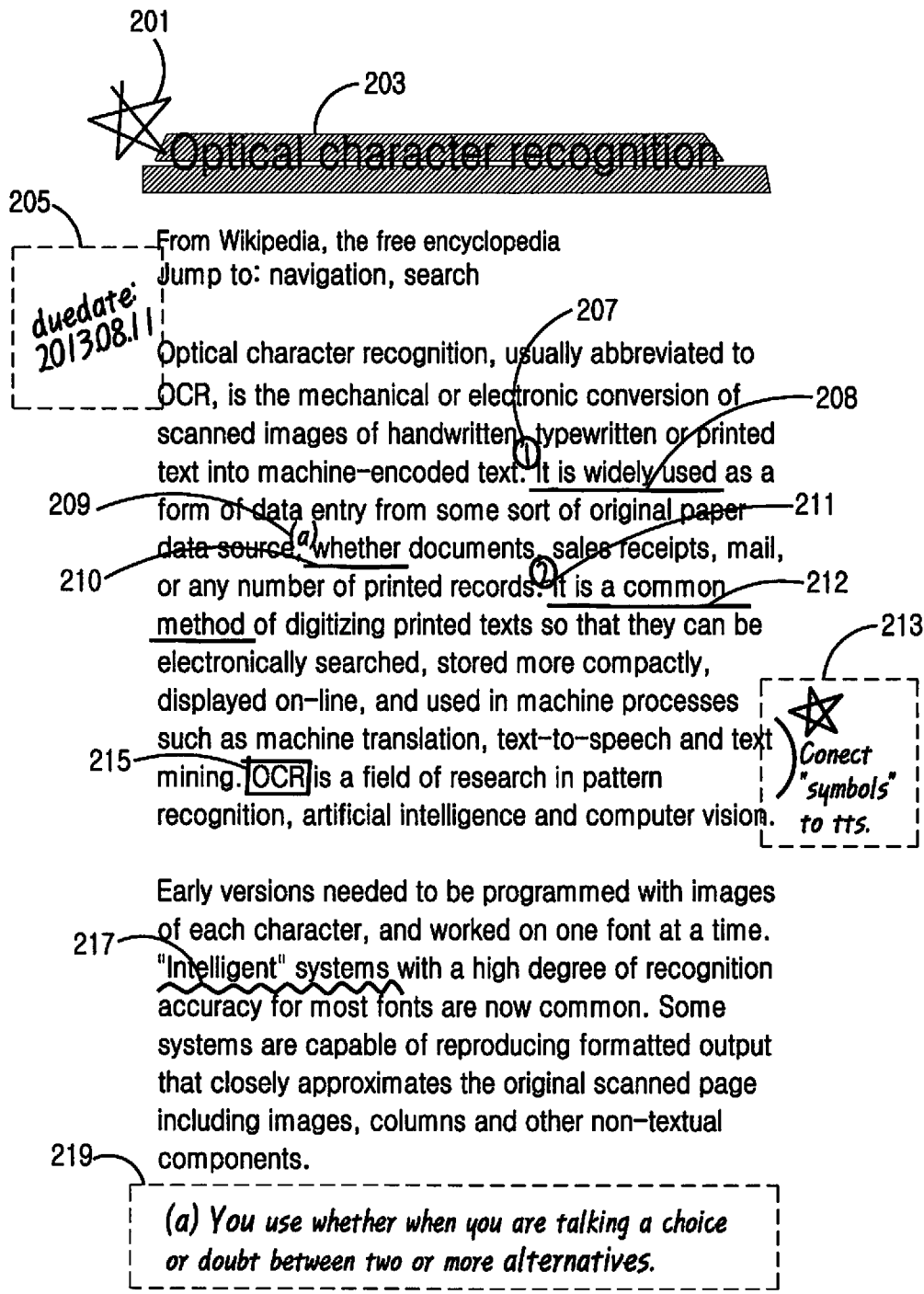
FIGS. 2A and 2B illustrate writing information that an electronic device can recognize, according to an embodiment of the present invention.
Figure 2B:
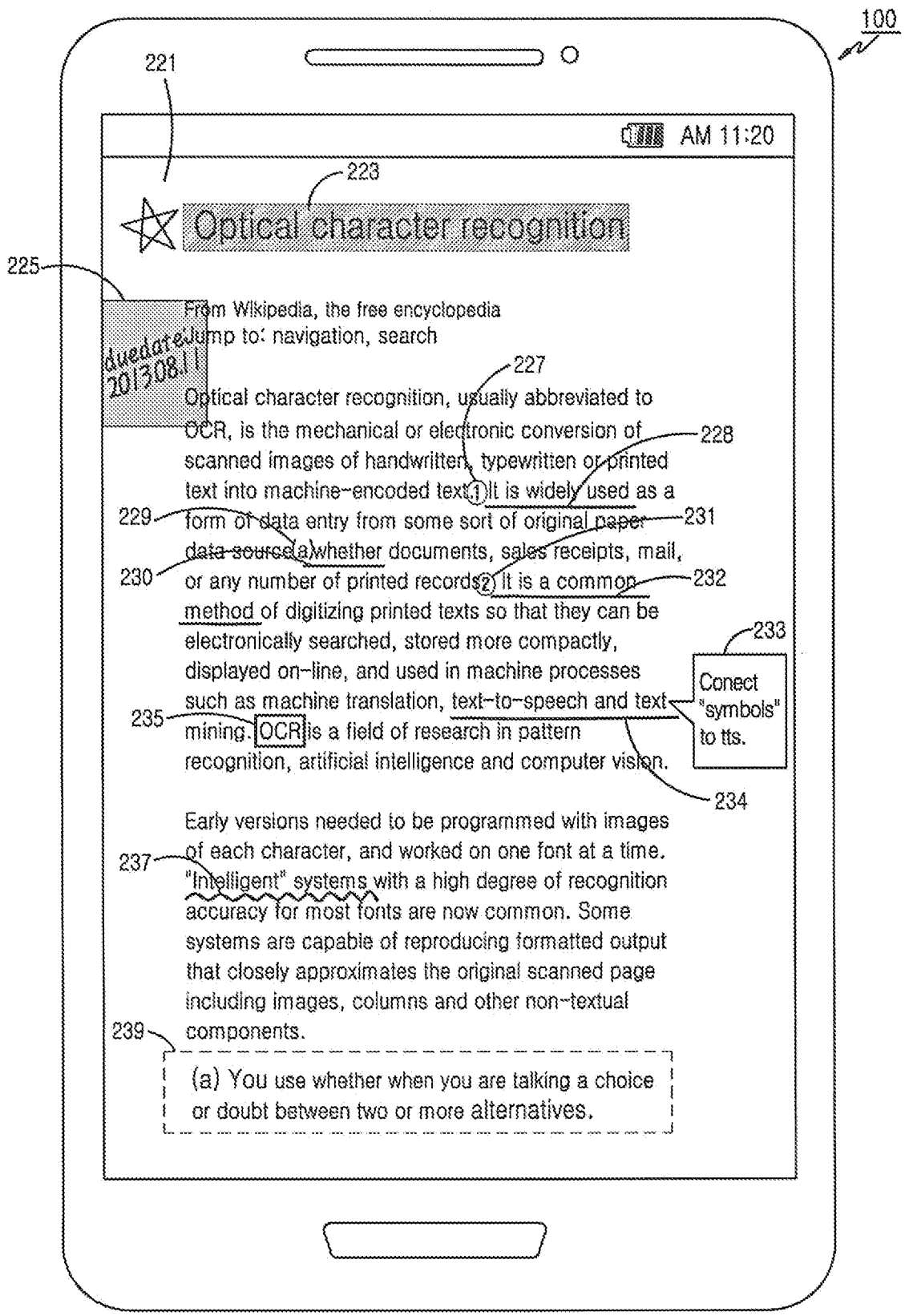

FIGS. 2A and 2B illustrate writing information that an electronic device can recognize, according to an embodiment of the present invention.

The electronic device 100 may detect analog text, such as a character or a symbol included in a document captured through a camera device including an image sensor, by using the handwriting processing program 116. That is, the electronic device 100 may detect a character or a symbol input in handwriting by a user, as well as a character or a symbol printed in a constant font. The electronic device 100 converts the character or the symbol input in handwriting in the detected analog text to a digital text, i.e., to a digital character or symbol. The electronic device 100 may display the converted digital text on the touch screen 133 of the electronic device 100.

According to an embodiment of the present invention, the electronic device 100 may detect a highlighter input 203 input in handwriting in a document in which a text of a constant font is printed. The electronic device 100 may convert the detected highlighter input 203 to a corresponding digital highlighter effect input.

According to an embodiment of the present invention, the electronic device 100 may detect a symbol input 201, 207, or 211, input by handwriting in the document in which a text of a constant font is printed. The electronic device 100 may convert the detected symbol input 201, 207, or 211 to a corresponding digital symbol input.

According to an embodiment of the present invention, the electronic device 100 may detect a character and/or numeral input 205, input by handwriting in the document in which a text of a constant font is printed. The electronic device 100 may convert the detected character and/or numeral input 205 to a corresponding digital character and/or numeral input.

According to an embodiment of the present invention, the electronic device 100 may detect an annotation symbol input 209 and 219, input in handwriting, input by handwriting, in the document in which a text of a constant font is printed. When detecting at least two of the same symbols input with handwriting in a document in which a text of a constant font is printed, the electronic device 100 may convert the detected annotation symbol to a corresponding digital annotation symbol input. According to an embodiment of the present invention, the annotation symbol input 209 may be described as one of various symbol inputs, such as, for example, the symbol inputs 201, 207, and 211.

According to an embodiment of the present invention, the electronic device 100 may detect a text 213, input by handwriting in the document in which a text of a constant font is printed. The electronic device 100 may convert the detected symbol and text 213 input with handwriting to a corresponding digital description input.

According to an embodiment of the present invention, the electronic device 100 may detect a figure input 215, input by handwriting in the document in which a text of a constant font is printed. The electronic device 100 may convert the figure input 215 detected in a document input with a digital text to a corresponding digital figure input.

According to an embodiment of the present invention, the electronic device 100 may detect an underline input 208, 210, 212, and 217 that is input with handwriting in the document in which a text of a constant font is printed. The electronic device 100 may convert the detected underline input to a corresponding digital underline input. The electronic device 100 may detect underlining with various geometrical lines such as a wave 217, a straight line 208, 210, or 212, and a dotted line.

According to an embodiment of the present invention, an operation in which the electronic device 100 converts a text such as the highlighter input 203, the character and/or numeral input 205, the symbol input 201, 207, 209, and 211, the description input 213, the underline input 208, 210, 212, and 217, or the figure input 215 to a digital text may include the operation of determining matching or similar data at the memory 110 of the electronic device 100.

Referring to FIG. 2B, the electronic device 100 may detect text information in which handwriting is input to the document in which a digital text is displayed, determine digital text corresponding to the detected text information, and display the determined digital text in the digital document. The electronic device 100 may determine whether a text included in document information acquired through text information stored at a database is a printed text of a digital form or a handwritten text.

According to an embodiment of the present invention, the electronic device 100 may convert handwritten text such as, for example, the detected highlighter input 203, the character and/or numeral input 205, the symbol input 201, 207, 209, and 211, the description input 213, the underline input 208, 210, 212, and 217, or the figure input 215 to a digital text input such as, for example, a digital highlighter input 223, a digital character and/or numeral input 225, a digital symbol input 221, 227, 229, and 231, a digital description input 233, a digital underline input 228, 230, 232, and 237, or a digital figure input 235, corresponding to each text. The electronic device 100 may display the determined digital text input on the touch screen 133. According to an embodiment of the present invention, the electronic device 100 may output digital text displayed on the touch screen 133 with a sound through the speaker 141.

According to an embodiment of the present invention, the electronic device 100 may convert the detected highlighter input 203 to the corresponding digital highlighter effect 223, and display the determined digital highlighter effect 223 in a predetermined area of the touch screen 133, or an area of a digital document corresponding to an area of the highlighter input 203.

According to an embodiment of the present invention, the electronic device 100 may convert the detected symbol input 201 to the corresponding digital symbol effect 221 (e.g., asterisk), and display the determined digital symbol effect 221 in a predetermined area of the touch screen 133, or an area of a digital document corresponding to an area of the symbol input 201.

According to an embodiment of the present invention, the electronic device 100 may convert the detected at least one symbol input 207 and 211 of the same method and a continued order to the corresponding digital symbol input 227 or 231, and display the determined digital symbol input 227 or 231 at a predetermined position of the touch screen 133, or a position of the digital document corresponding to a position of the at least one symbol input 207 and 211.

According to an embodiment of the present invention, the electronic device 100 may convert the detected two or more same annotation symbols 209 and 219 to the corresponding digital annotation symbols 229 and 239, and display the determined digital annotation symbols 229 and 239 at positions of the digital document corresponding to positions of the annotation symbols 209 and 219 or a predetermined position of the touch screen 133. According to an embodiment of the present invention, when selecting the annotation 229 of the digital document displayed on the touch screen 133, the electronic device 100 may move a display to a position of 239 of the digital document corresponding to the annotation 209. When selecting 239, the electronic device 100 may display the position of 209 of the digital document.

According to an embodiment of the present invention, by combining at least one of the detected parentheses, asterisk, and text, the electronic device 100 may convert the symbol and character 213 input with handwriting to the corresponding digital symbol and text 233. The electronic device 100 may convert the combined symbol and character 213 to the digital description input 233 through a preset database, as described above. The electronic device 100 may display the determined digital description input 233 at a position of the digital document corresponding to a position of the symbol and character 213t or a predetermined position of the touch screen 133.

According to an embodiment of the present invention, the electronic device 100 may convert a rectangle 215, a triangle, a circle, and figure input that is input with handwriting to the corresponding digital figure input 235, and display the determined digital figure input 235 at a position of the digital document corresponding to a position of the figure input 215, or a predetermined position of the touch screen 133.

According to an embodiment of the present invention, the electronic device 100 may convert a underline input such as, for example, the detected straight line form underline 208, 210, or 212, a wave form underline 217, or a dotted line form underline to a corresponding digital underline input 228, 230, 232, and 237, and display the determined digital underline input 228, 230, 232, and 237 at a position of the digital document corresponding to a position of the underline input 208, 210, 212, and 217 or a predetermined position of the touch screen 133.

According to an embodiment of the present invention, the electronic device 100 may not convert handwritten text into digital text. The electronic device 100 may copy or cut out a predetermined area including handwritten text that is not converted to a digital text. The electronic device 100 may display a predetermined area cropped through copy or crop in a predetermined area of the digital document.

According to an embodiment of the present invention, the electronic device 100 may not convert handwritten input (digital character and/or numeral input) such as 'due date: 2013.08.11 205 to a corresponding digital input. Handwritten input may not converted to a corresponding digital input when a digital text corresponding to a portion or the entire handwritten input is not matched at a database. The electronic device 100 may crop the handwritten input area 205 in image data that photographs the document and display the cropped handwritten area 225 at a predetermined position of the digital document. When displaying the cropped handwritten area 225, the electronic device 100 may rotate and display a handwritten area that obliquely input with a slope corresponding to a text line of the digital document. According to an embodiment of the present invention, when the electronic device 100 does not determine a character or numeral corresponding at least one character or numeral of handwritten input, the electronic device 100 may output a matching error code (wrongly converted text). When displaying the cropped handwritten area 225, the electronic device 100 may display a matching error code in the cropped handwritten area 225 of the digital document when a display is released, and display the cropped handwritten 225 when a matching error code is displayed.

According to an embodiment of the present invention, when displaying various digital inputs such as the above-described digital highlighter input, digital character and/or numeral input, digital symbol input, digital description input, digital underline input, or digital figure input on the touch screen 133, the electronic device 100 does not limit the area for display to a previously displayed area and may move a position thereof.

Figure 3A:
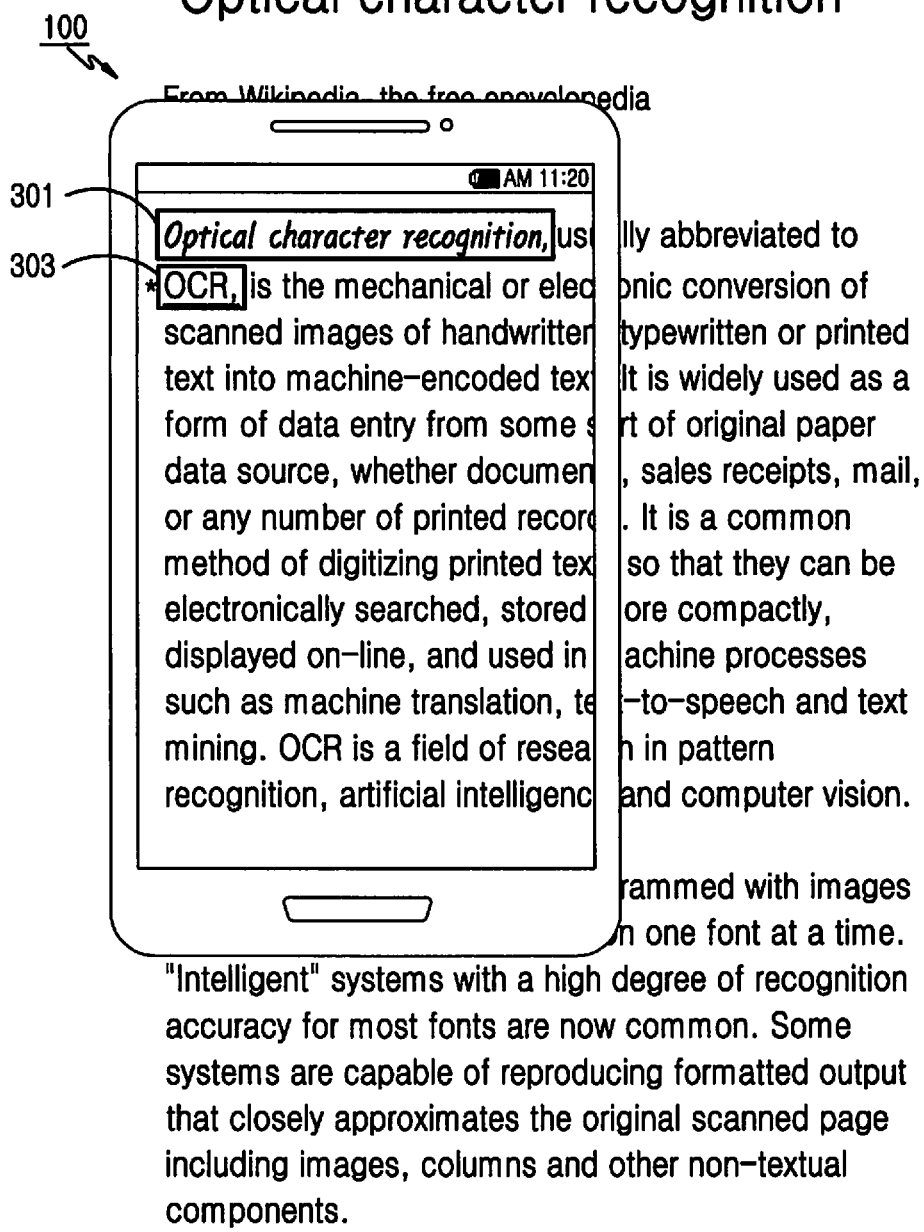
FIGS. 3A and 3B illustrate an operation of displaying document information that an electronic device acquires, according to an embodiment of the present invention.
Figure 3B:
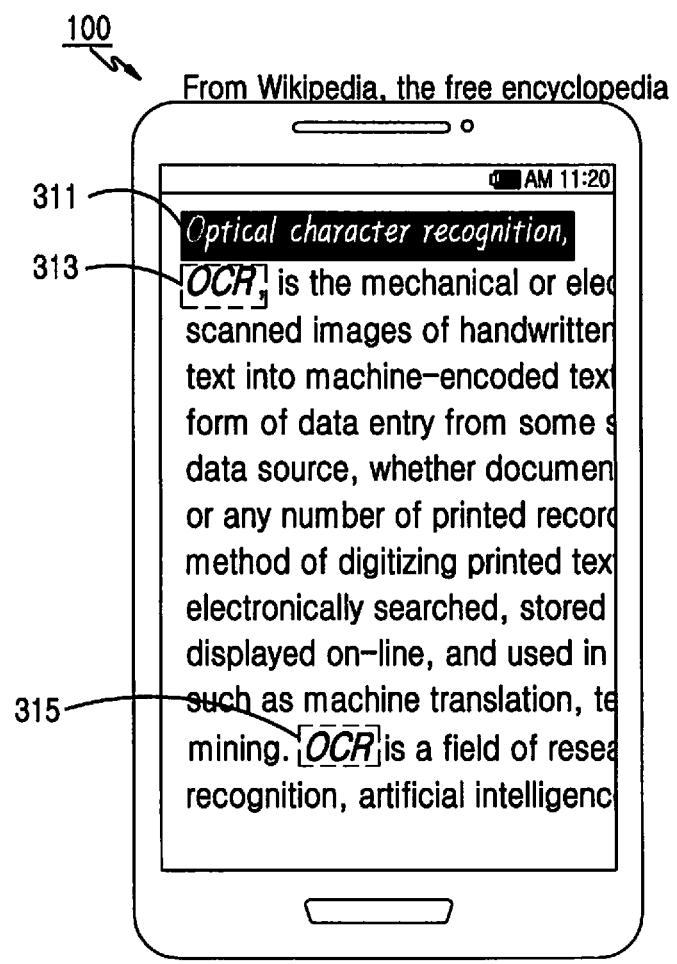

FIGS. 3A and 3B illustrate operation of displaying document information that an electronic device acquires, according to an embodiment of the present invention.

According to an embodiment of the present invention, the electronic device 100 may photograph a document formed with a text and handwriting input and generate a digital document. When including a figure input with handwriting in acquired document information, the electronic device 100 may include a figure input with handwriting or a function corresponding to a figure in the digital document.

According to an embodiment, the electronic device 100 may photograph a document formed with a text and handwriting input through an image sensor. When including a text having handwriting input in acquired document information, the electronic device 100 may convert the handwritten input to a corresponding digital text.

According to an embodiment of the present invention, the electronic device 100 may detect a figure displayed with handwritten input in a text portion of a constant font in acquired document information. The electronic device 100 may determine a figure in a database that matches the handwritten input.

According to an embodiment of the present invention, the electronic device 100 may detect a figure of a rectangle 301 displayed around 'optical character recognition' in the acquired document information, and may detect a figure of an asterisk (*) 303 displayed near 'OCR'. The electronic device 100 may determine a digital text matched to the quadrangle 301 and the asterisk 303t with reference to a database.

As shown in FIG. 3B, the electronic device 100 may convert a text having handwriting input to acquired document information. The electronic device 100 may match the text having handwriting input to a digital text of a database and display an acquired digital text or a function connected to the digital text in the digital document.

According to an embodiment of the present invention, the electronic device 100 may determine a digital figure matched to handwriting input, and display an acquired digital figure at a predetermined position of the digital document.

According to an embodiment of the present invention, the electronic device 100 may detect a FIG. 311 of a rectangular form input to an area of 'optical character recognition' in acquired document information. The electronic device 100 may determine information matched to the detected rectangular form FIG. 311 through a database. The electronic device 100 may reverse and output an area 'optical character recognition' of the digital document according to the determined information.

According to an embodiment of the present invention, the electronic device 100 may detect that an asterisk 303 is input with handwriting in an area of 'OCR' in acquired document information. The electronic device 100 may determine information matched to the detected asterisk 303 through a database. The electronic device 100 may reset a font of a word 'OCR' 313 with a predetermined method according to the determined information. The electronic device 100 may detect the same word 'OCR' 315. The electronic device 100 may reset a font of the detected 'OCR' 315 with the same method as a resetting font of the 'OCR' 313.

Figure 4A:
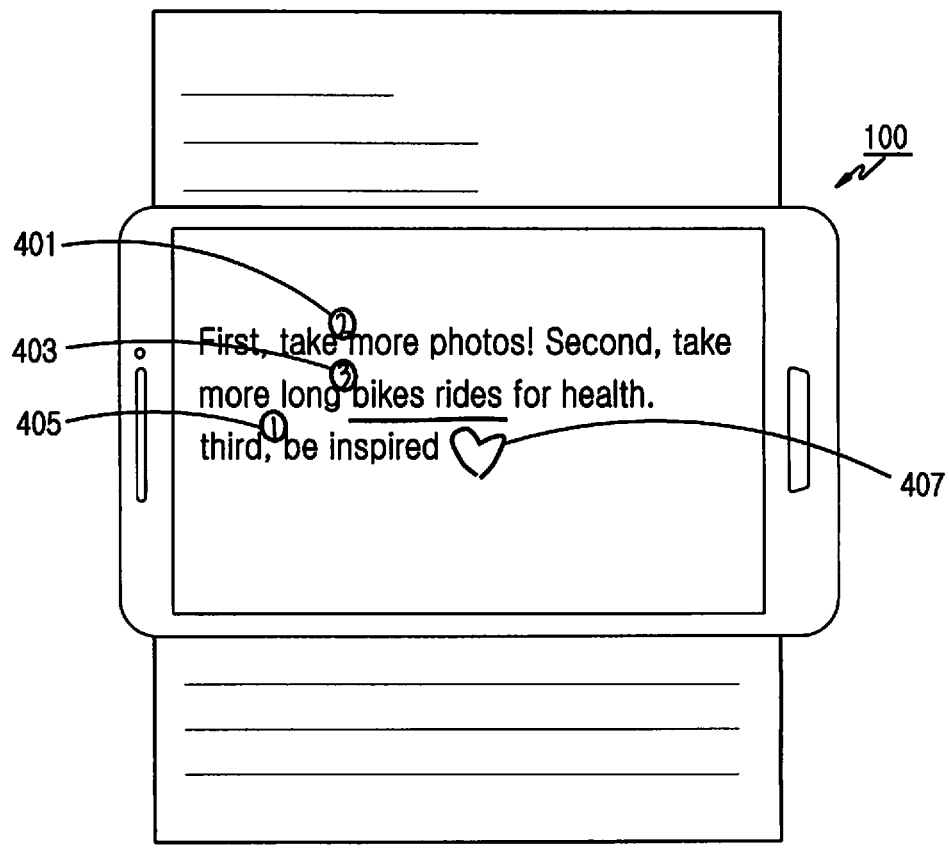
FIGS. 4A and 4B illustrate an operation of displaying document information that an electronic device acquires, according to an embodiment of the present invention.
Figure 4B:
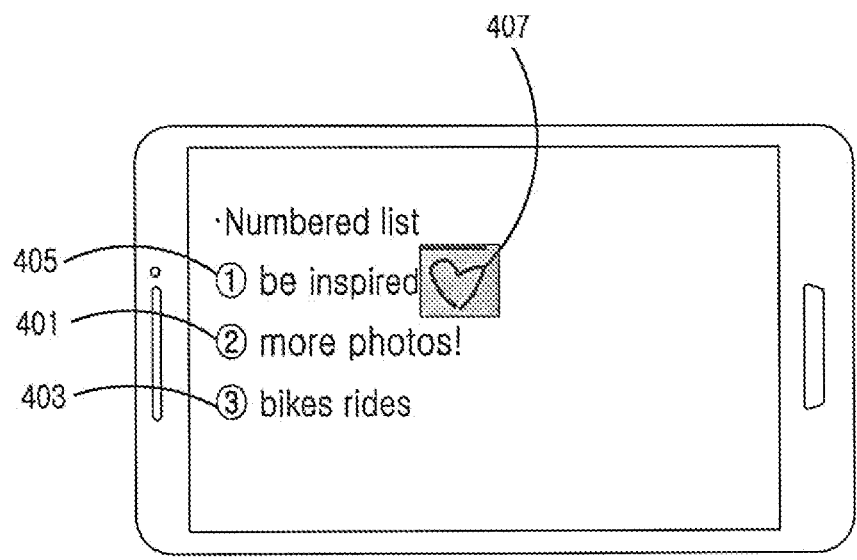

FIGS. 4A and 4B illustrate an operation of displaying document information that an electronic device acquires, according to an embodiment of the present invention.

The electronic device 100 may generate a digital document through image data including text and handwriting input. When including a symbol input with handwriting in acquired document information, the electronic device 100 may include a symbol input with handwriting or a function corresponding to a symbol in the digital document.

According to an embodiment of the present invention, the electronic device 100 may detect at least one symbol input with handwriting in acquired document information. The electronic device 100 may determine a digital symbol that matches the detected at least one symbol at a database. The electronic device 100 may determine two or more connected symbols among the determined symbol.

According to an embodiment of the present invention, the electronic device 100 may detect a symbols 405, 401, and 403 input with handwriting in acquired document information. The electronic device 100 may determine a matched digital symbol through information of a database. The electronic device 100 may determine that two or more digital symbols of matched digital symbols 405, 401, and 403 are connected.

According to an embodiment of the present invention, when acquired document information includes an underline in relation to a symbol input with handwriting, the electronic device 100 may determine a word included in an area of the underline. According to an embodiment of the present invention, the electronic device 100 may detect the symbol 403 in acquired document information and determine a phrase 'bikes rides' included in an area of an underline input with handwriting in an area near 403. When determining a phrase 'bikes rides' included in an area of near 403, the electronic device 100 may refer to acquired document information and/or a digital document generated through acquired document information.

According to an embodiment of the present invention, when acquired document information does not include handwriting input of an underline in relation to a symbol input with handwriting, the electronic device 100 may determine a word from an area in which a symbol input with handwriting is positioned to an area in which a sentence is terminated. According to an embodiment of the present invention, the electronic device 100 may detect the symbol 401 in acquired document information and determine a phrase 'more photos' from a word 'more' at a position of the symbol 401 to a word 'photos' where the sentence is terminated. According to an embodiment of the present invention, the electronic device 100 may detect the symbol 405 in acquired document information and determine 'be inspired' from a word 'be' at a symbol position of 405 to a word 'inspired' where the sentence is terminated. When determining a phrase 'more photos' of 401 or a phrase 'be inspired' of 405, the electronic device 100 may refer to acquired document information and/or a digital document generated through acquired document information.

According to an embodiment of the present invention, a heart symbol 407 may be included in a determined area of the symbol 405. When determining an area of 405, the electronic device 100 may include the heart symbol 407 input with handwriting beside 'be inspired'.

The electronic device 100 may match a symbol input with handwriting to a digital symbol of a database. When two or more related symbols are determined, the electronic device 100 may display two or more related symbols and a word or a sentence connected to each symbol.

According to an embodiment of the present invention, the electronic device 100 may display two or more circle characters determined through acquired document information in a separate area of the digital document. According to an embodiment of the present invention, the electronic device 100 may convert a symbol of 405, 401, and 403 to a related symbol in acquired document information, as shown in the touch screen 133 of FIG. 4B. The electronic device 100 may determine words in an area including each symbol 405, 401, and 403 and another symbol, and display the word and the other symbol in a separate area. The electronic device 100 may determine at least one area of a predetermined area of the digital document, a pop-up window displayed in the digital document, and a layer area separate from the digital document as a separate area to be displayed.

According to an embodiment of the present invention, the electronic device 100 may determine 'be inspired' and the heart symbol 407 included in the symbol 405 as a first symbol area. The electronic device 100 may determine a digital heart symbol matched to the heart symbol 407 input with handwriting. When a digital heart symbol cannot be matched, the electronic device 100 may crop a symbol area of acquired document information and include the symbol area in the digital document. According to an embodiment of the present invention, the electronic device 100 may determine 'more photos' included in the symbol 401 as a second symbol area. According to an embodiment of the present invention, the electronic device 100 may determine 'bikes rides' included in the symbol 403 as a third symbol area.

According to an embodiment of the present invention, when a symbol is related to order, as described above, the electronic device 100 may input a symbol related to order, as shown in FIG. 4B. The electronic device 100 may determine that two or more symbols related to order are input in order of 405, 403, and 401 and rearrange the symbols in an order of 405, 401, and 403. According to an embodiment of the present invention, the electronic device 100 may reset a related symbol area input in an order of a second symbol area, a third symbol area, and a first symbol area to an order of a first symbol area, a second symbol area, and a third symbol area.

According to an embodiment of the present invention, a predetermined operation can display the above-described 'numbered list' in proper order.

Figure 5A:
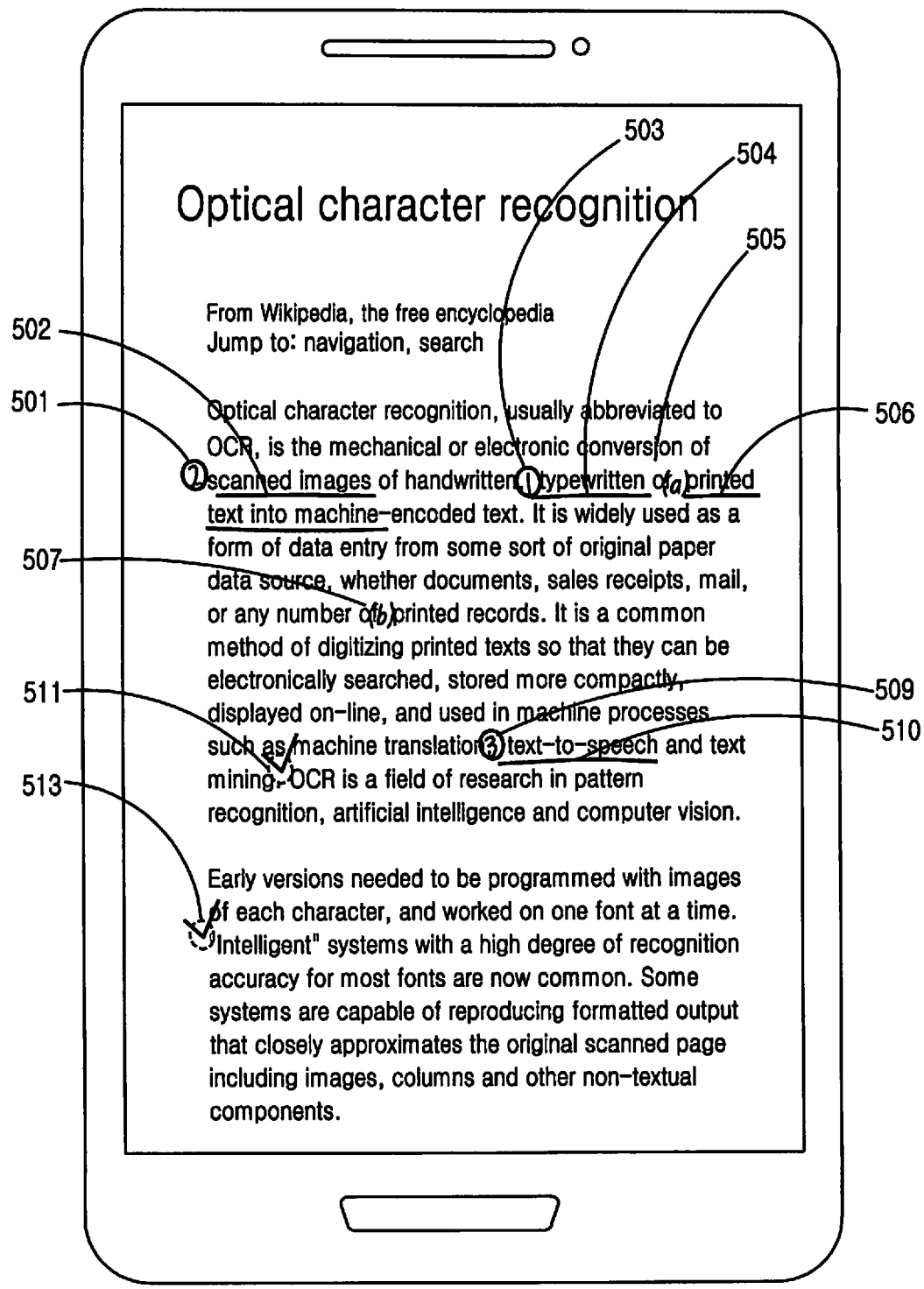
FIGS. 5A and 5B illustrate an operation of displaying document information that an electronic device acquires, according to an embodiment of the present invention.
Figure 5B:
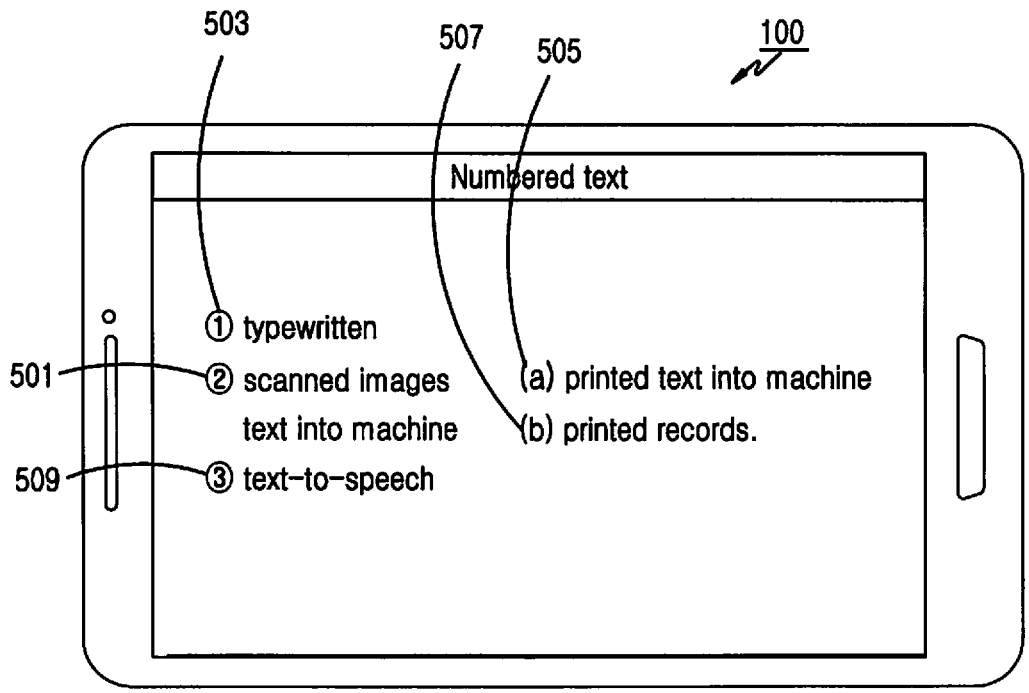
Figure 5B:
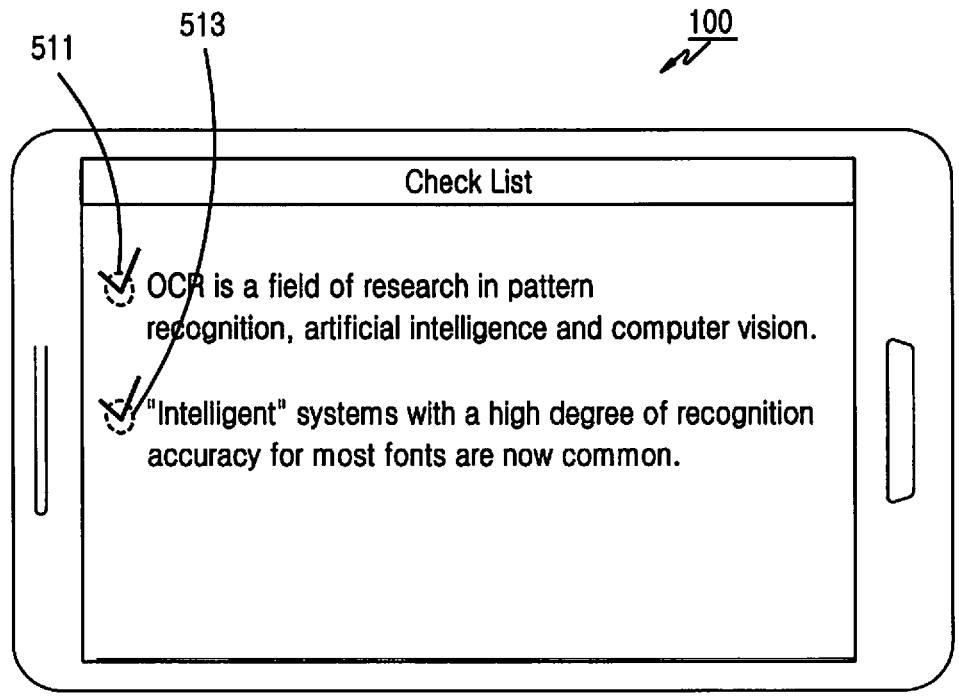

FIGS. 5A and 5B illustrate operation of displaying document information that an electronic device acquires, according to an embodiment of the present invention.

According to an embodiment of the present invention, the electronic device 100 may detect at least one symbol input with handwriting in acquired document information. The electronic device 100 may determine that the detected at least one symbol is formed with two or more types and distinguish and determine a symbol according to each type.

According to an embodiment of the present invention, the electronic device 100 may detect a symbol of 501, 503, 505, 507, 509 and check marks 511 and 513 input with handwriting in acquired document information. The electronic device 100 may determine a matched digital symbol through information of a database. The electronic device 100 may determine that symbols 503, 501, and 509 match to one type (e.g., a circle character), may determine that symbols 505 and 507 match to another type (e.g., a parenthesis character), and may determine that check marks 511 and 513 match to a single type.

According to an embodiment of the present invention, the electronic device 100 may determine an area of a word or a sentence in relation to a distinguished symbol (e.g., a circle character). When a circle character area includes an underline, the electronic device 100 may determine a word corresponding to the underline. According to an embodiment of the present invention, the electronic device 100 may detect the symbol 501 in acquired document information and determine a phrase 'scanned images' in an area of an underline 502 input with handwriting near the symbol 501. When determining a phrase 'scanned images' in an area of the input underline 502, the electronic device 100 may refer to acquired document information and/or a digital document generated through acquired document information. The electronic device 100 may determine a word 'typewritten' in an area of an underline 504 near the symbol 503, and a phrase 'text-to-speech' in an area of an underline 510 near the symbol 509, according to the above-described method.

According to an embodiment of the present invention, the electronic device 100 may determine a phrase 'printed text into machine' in an area of an underline 506 near the symbol 505, according to the above-described method. When an area near the symbol 507 does not include an underline, the electronic device 100 may determine a phrase included to be associated with the symbol 507 as 'printed records', according to a method described-above with reference to FIG. 4A.

According to an embodiment of the present invention, the electronic device 100 may determine an area of a word or a sentence associated with a check mark in relation to a distinguished symbol (e.g., a check mark) according to the above-described method. Specifically, when the electronic device 100 detects a check mark input with handwriting, the electronic device 100 may determine an area of a word or a sentence in which the check mark indicates to the end of the sentence. According to an embodiment of the present invention, the electronic device 100 may determine an area corresponding to the check mark 511 as 'OCR is a field of research in pattern recognition, artificial intelligence and computer vision', and may determine an area corresponding to the check mark 513 as '"intelligent" system with a high degree of recognition accuracy for most fonts are now common'.

As shown in FIG. 5B, the electronic device 100 may determine a text in which handwriting is input to acquired document information. When symbols input with handwriting are formed with two or more types, the electronic device 100 may display a word or a sentence connected to each type of symbol.

As shown in FIG. 5B(a), according to an embodiment of the present invention, the electronic device 100 may display a symbol such as a circle character, a parenthesis character, and a check mark according to each type determined through acquired document information, and may display a word or a sentence included in an area of the symbol in a separate area of the digital document. When determining a range of the above-described symbol, the electronic device 100 does not limit a range of the above-described symbol to a special character of a circle character or a parenthesis character, and may include various special characters in a range of a symbol. The electronic device 100 may determine the symbol 503 and 'typewritten' as a first circle character area, the symbol 501 and 'scanned images' as a second circle character area, the symbol 509 and 'text-to-speech' as a third circle character area, the symbol 505 and 'printed text into machine' as a first parenthesis character area, the symbol 507 and 'printed record' as a second parenthesis character area, the check mark 511 and 'OCR is a field of research in pattern recognition, artificial intelligence and computer vision' as a 'first check mark area', and the check mark 513 and '"intelligent" system with a high degree of recognition accuracy for most fonts are now common' as a second check mark area'. Each area may be an area divided to correspond to each symbol type acquired in the electronic device 100.

According to an embodiment of the present invention, the electronic device 100 may display symbols and corresponding text areas according to an order of the symbols on the touch screen 133 that displays the digital document.

According to an embodiment of the present invention, the electronic device 100 may determine that a circle character symbol input with handwriting is not input in order, and may output a circle character area acquired in the digital document according to a predetermined order. The electronic device 100 may input an order of a second circle character area, a first circle character area, and a the third character area, and the electronic device 100 may determine a circle character area in order of a first circle character area, a second circle character area, and a the third character area, according to a predetermined function in a circle character of a digital symbol. The electronic device 100 may display the first circle character area, the second circle character area, and the third character area in which the order is determined in a predetermined display area (e.g., 'numbered text') of the touch screen 100. According to an embodiment of the present invention, the electronic device 100 may determine another type of symbol (e.g., a parenthesis character area) that can display in order and may display a first parenthesis character area and a second parenthesis character area of a parenthesis character area in an area of a numbered text that displays the first circle character area, the second circle character area, and the third character area of the above-described circle character area.

Figure 6A:
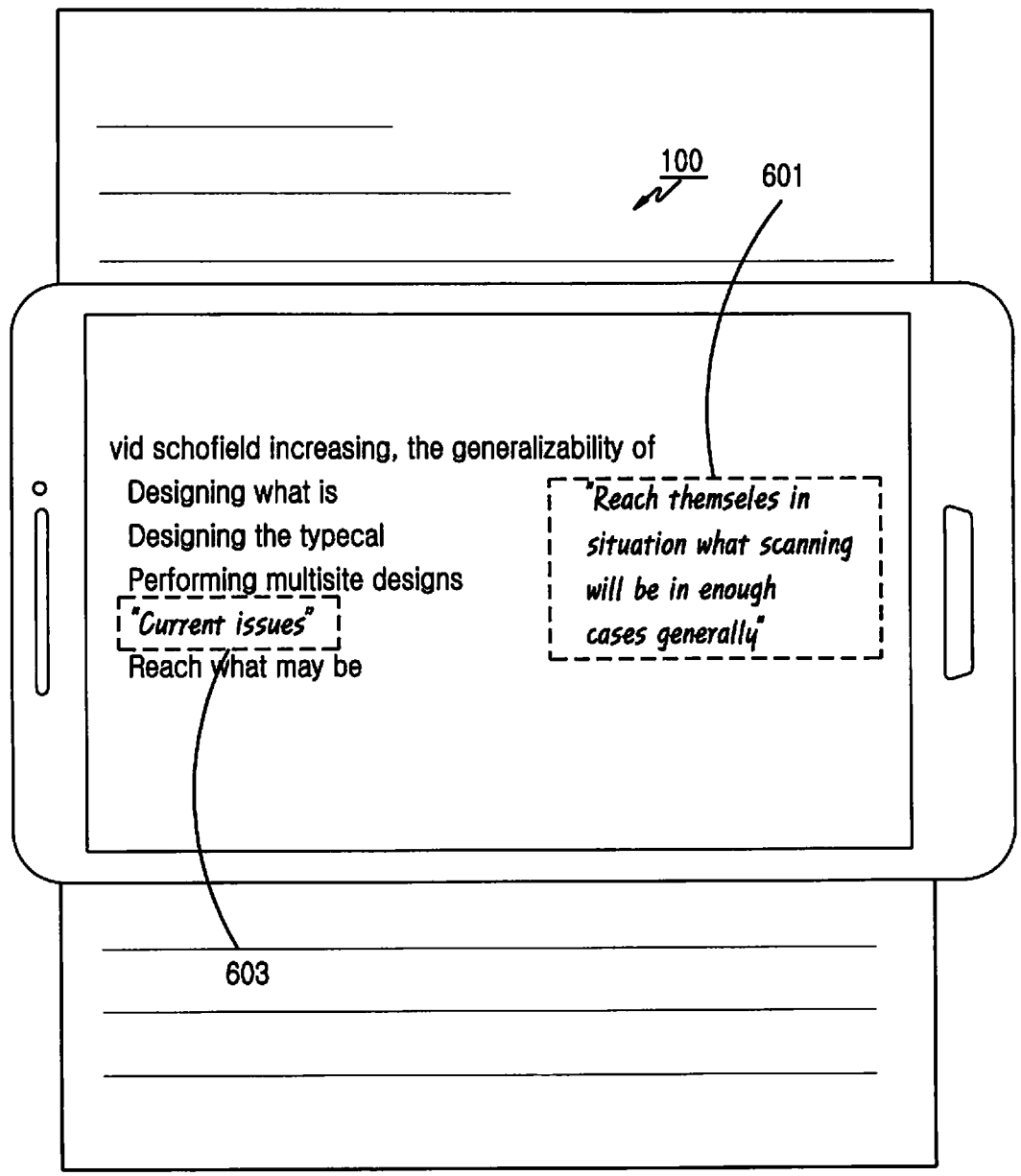
FIGS. 6A and 6B illustrate an operation of displaying document information that an electronic device, acquires according to an embodiment of the present invention.
Figure 6B:
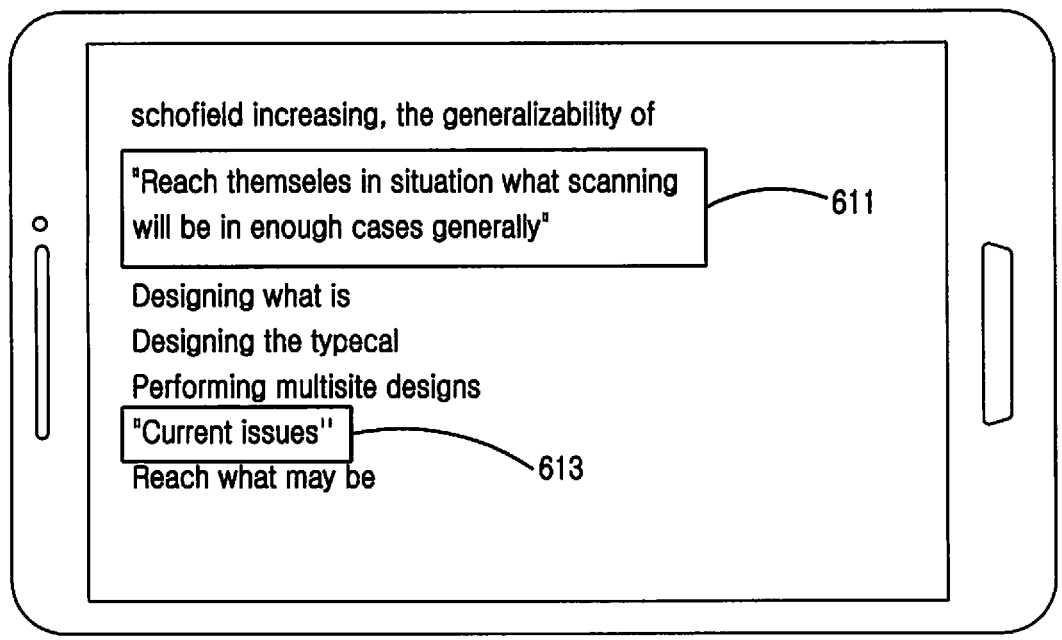

As shown in FIG. 5B(b), according to an embodiment of the present invention, the electronic device 100 may display a symbol corresponding to each type (e.g., a check mark area) and an area including the symbol in an area separate from an area that displays the digital document. According to an embodiment of the present invention, the electronic device 100 may generate and display a new pop-up window for a first check mark area and a second check mark area on the touch screen 133 that displays the digital document. FIGS. 6A and 6B illustrate operation of displaying document information that an electronic device acquires, according to an embodiment of the present invention.

When displaying a digital document generated with acquired document information on a touch screen, the electronic device 100 may output a text corresponding to handwriting input in a predetermined area (e.g., space between lines) formed with a text.

As shown in FIG. 6A, the electronic device 100 may detect "Current issues" 603 input with handwriting between lines formed with a text of a document printed in a constant font. The electronic device 100 may detect "Reach themselves in situation what scanning will be in enough cases generally" 601 input with handwriting in an area in which a text is not printed and under a line formed with a text. The electronic device may determine a digital text matched to a detected text.

According to FIG. 6B, the electronic device 100 may display a determined digital text "Current issues" 613 in a space between 'Performing multisite designs' and 'Reach what may be', which is the same position as that of "Current issues" 603 input with handwriting.

According to an embodiment of the present invention, the electronic device 100 may insert determined digital text "Reach themselves in situation what scanning will be in enough cases generally" 611 under "schofield increasing, the generalizability of" displayed in the digital document with reference to a position of "Reach themselves in situation what scanning will be in enough cases generally" 601 input with handwriting.

According to an embodiment of the present invention, the electronic device 100 may display determined "Reach themselves in situation what scanning will be in enough cases generally" 611 at the same position as that of "Reach themselves in situation what scanning will be in enough cases generally" 601 input with handwriting.

According to an embodiment of the present invention, when the electronic device 100 does not determine a digital text matched to a text input with handwriting, the electronic device 100 may crop image data of a text area in which handwriting is input, and display the cropped image in a predetermined area of the digital document.

According to an embodiment of the present invention, when determining a digital text matched to a text "Reach themselves in situation what scanning will be in enough cases generally" 601 which is input in handwriting, the electronic device 100 may not determine characters of a digital text matched to at least one character. Because the electronic device 100 cannot determine a character of the digital text, the electronic device 100 cannot complete a digital text, such as the above-described "Reach themselves in situation what scanning will be in enough cases generally" 611. The electronic device 100 may crop image data of an area "Reach themselves in situation what scanning will be in enough cases generally" 601, and insert the cropped image 601 at a position that displays "Reach themselves in situation what scanning will be in enough cases generally" 611 with reference to FIG. 6B. According to an embodiment of the present invention, when displaying the cropped image 601, the electronic device 100 may display the cropped image at a position of a corresponding digital document at the same position as that of "Reach themselves in situation what scanning will be in enough cases generally" 601 and determine and change a random position.

FIG. 7A to 7E illustrate operation of displaying document information that an electronic device acquires, according to an embodiment of the present invention.

The electronic device 100 may display the digital text in the digital document with various methods.

According to an embodiment of the present invention, the electronic device 100 may determine each of various types of symbols or characters included in a text in which handwriting is input to acquired document information.

According to an embodiment of the present invention, the electronic device 100 may determine a symbol, an asterisk (predetermined symbol), and a character designating a range of text printed in a constant font in a symbol and character 701 input with handwriting in acquired document information. The electronic device 100 may determine a symbol that designates a range of a text and determine a text corresponding to a symbol that displays a range. The electronic device 100 may detect a character input with handwriting and determine a matched digital character. The electronic device 100 may determine an asterisk (predetermined symbol) and connect a text corresponding to a symbol that designates a range according to a function of an asterisk and a character input with handwriting.

Figure 7A:
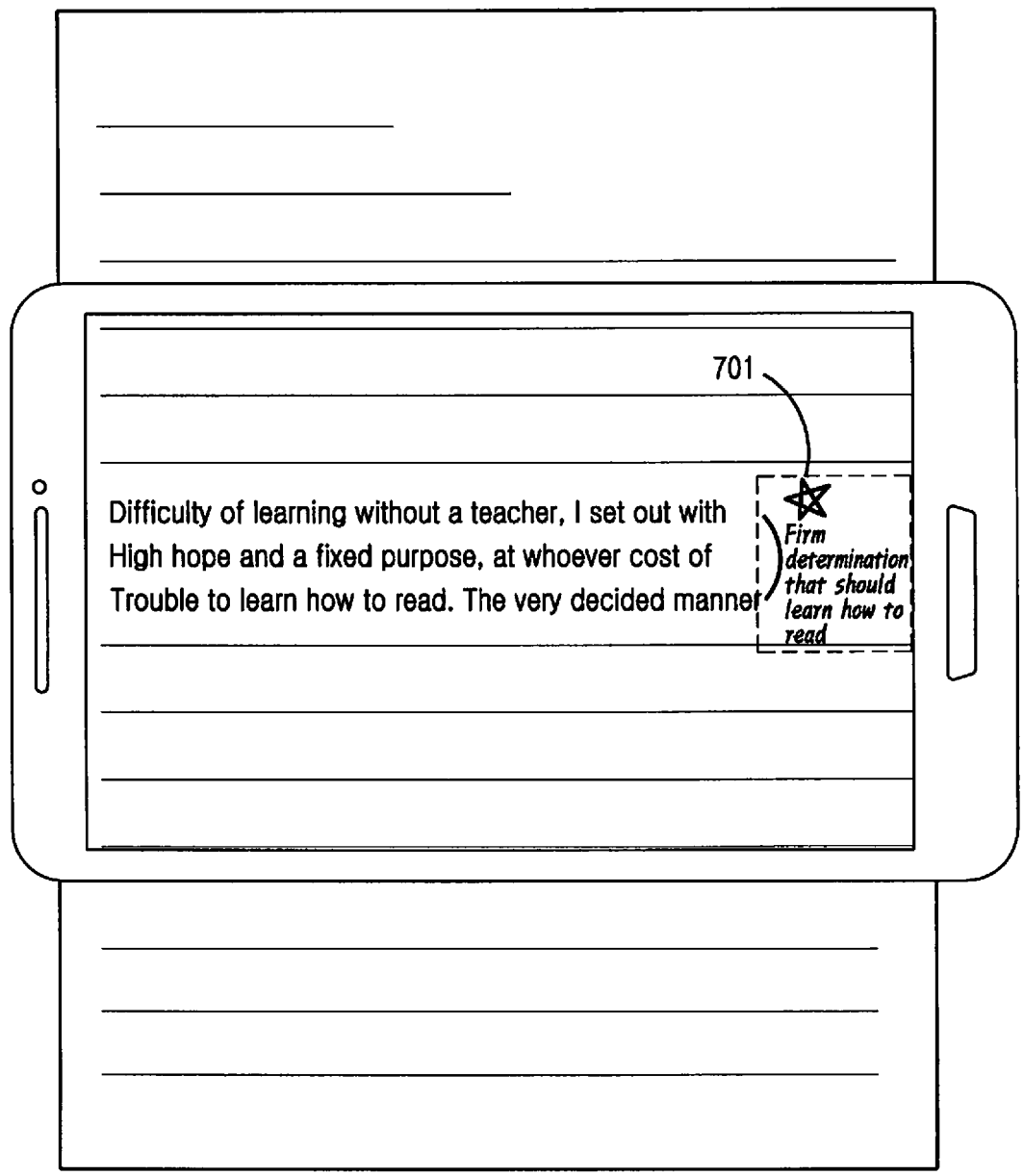
FIGS. 7A to 7E illustrate an operation of displaying document information that an electronic device acquires, according to an embodiment of the present invention.

According to an embodiment of the present invention, as shown in FIG. 7A, in acquired document information, the electronic device 100 may determine a predetermined area of a printed text according to a symbol, input with handwriting, that designates a range of a text printed in a constant font. The electronic device 100 may determine a text area including a symbol with two lines that start with 'High' of FIG. 7A and that terminate with 'manner', and determine a sentence 'at whoever cost of trouble to learn how to read' divided by a comma (,) or a period (.) in the determined two lines to an area corresponding to a symbol that designates a range.

According to an embodiment of the present invention, when displaying a text in which handwriting is input to acquired document information in the digital document, the electronic device 100 may display a menu that may determine at least one method that may display.

Figure 7B:
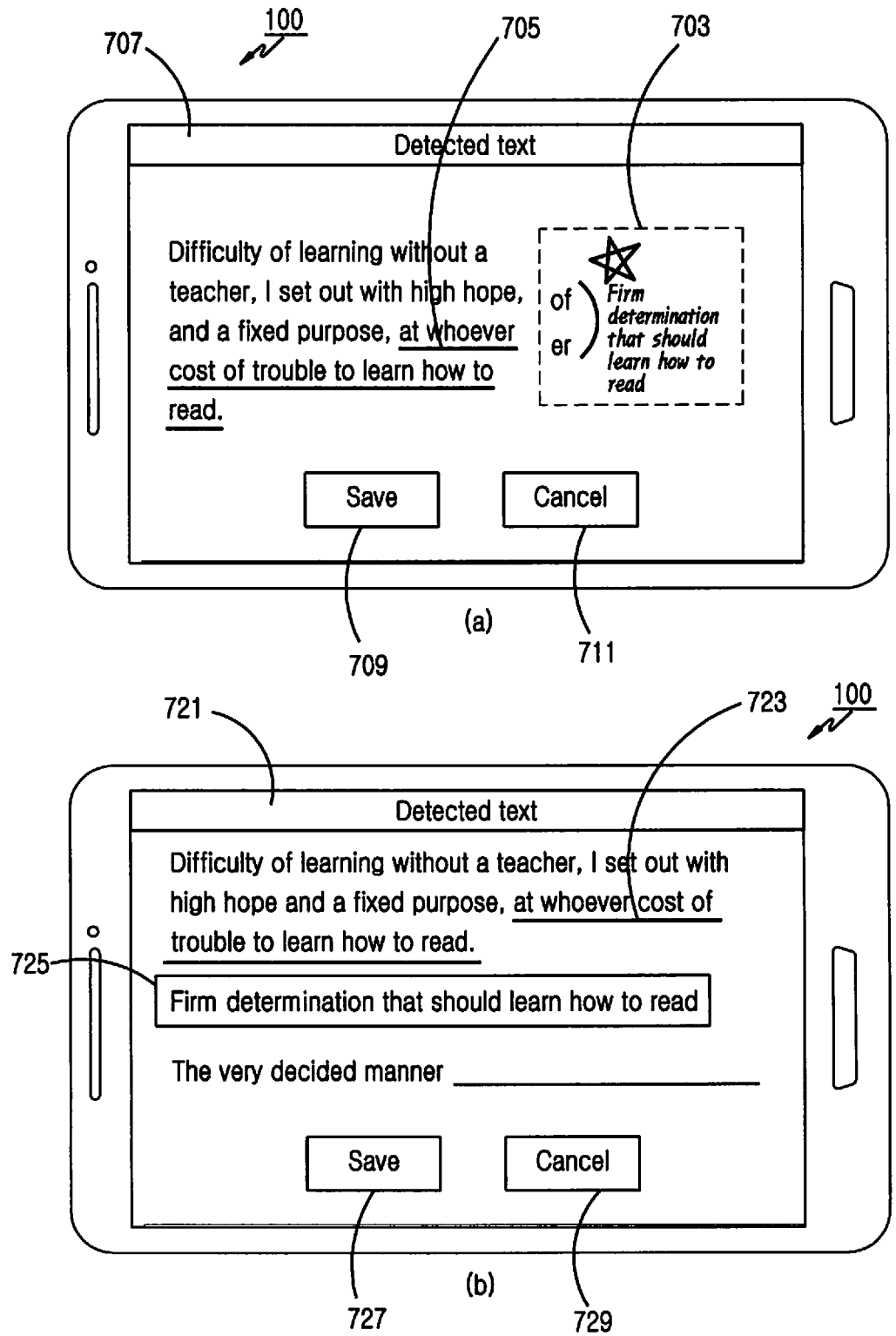

As shown in FIG. 7B(b), according to an embodiment of the present invention, the electronic device 100 may convert a character and a symbol input with handwriting in acquired document information to a matched digital text, and provide a method that can display according to a function of the determined digital text.

According to an embodiment of the present invention, when outputting a method of determining to display a text in which handwriting input in the digital document, the electronic device 100 may output the text in a selection area separate from a digital document such as 'Detected text' 721. The electronic device 100 may display with an underline, as shown in 'at whoever cost of trouble to learn how to read' 723 corresponding to a symbol that displays a range and insert a digital text 'firm determination that should learn how to read' 725 (predetermined function of an asterisk) below 'at whoever cost of trouble to learn how to read' 723. The electronic device 100 may display an icon 'save' 727 and/or 'cancel' 729 that can determine whether to display in the digital document according to the above-described method.

As shown in FIG. 7B(a), according to an embodiment of the present invention, when the electronic device 100 cannot determine at least one of a character and a symbol input with handwriting in acquired document information to a digital text, the electronic device 100 may provide various methods that may display in a predetermined digital document.

According to an embodiment of the present invention, when outputting a method of determining to display a text in which handwriting is input in the digital document, the electronic device 100 may output the text in a selection area separate from a digital document such as 'Detected text' 707. The electronic device 100 may determine a digital symbol matched to a symbol that designates a range and be displayed with an underline, as shown in corresponding 'at whoever cost of trouble to learn how to read' 705 according to the digital symbol.

According to an embodiment of the present invention, when the electronic device 100 cannot determine a digital symbol matched to a symbol that displays a range, the electronic device 100 cannot display a underline, as shown in corresponding 'at whoever cost of trouble to learn how to read' 705 according to the digital symbol. The electronic device 100 may not determine at least one digital text in a predetermined symbol (asterisk) input with handwriting and a character input with handwriting as well as a symbol that designates a range in which handwriting is input, and may not perform a combined function. The electronic device 100 may crop image data corresponding to a symbol and character area in which handwriting is input in the acquired document information, and display a cropped image at the same digital document position as that of an area in which handwriting is input. The electronic device 100 may display an icon 'save' 709 and/or 'cancel' 711 that can determine whether to display in the digital document according to the above-described method.

Figure 7C:
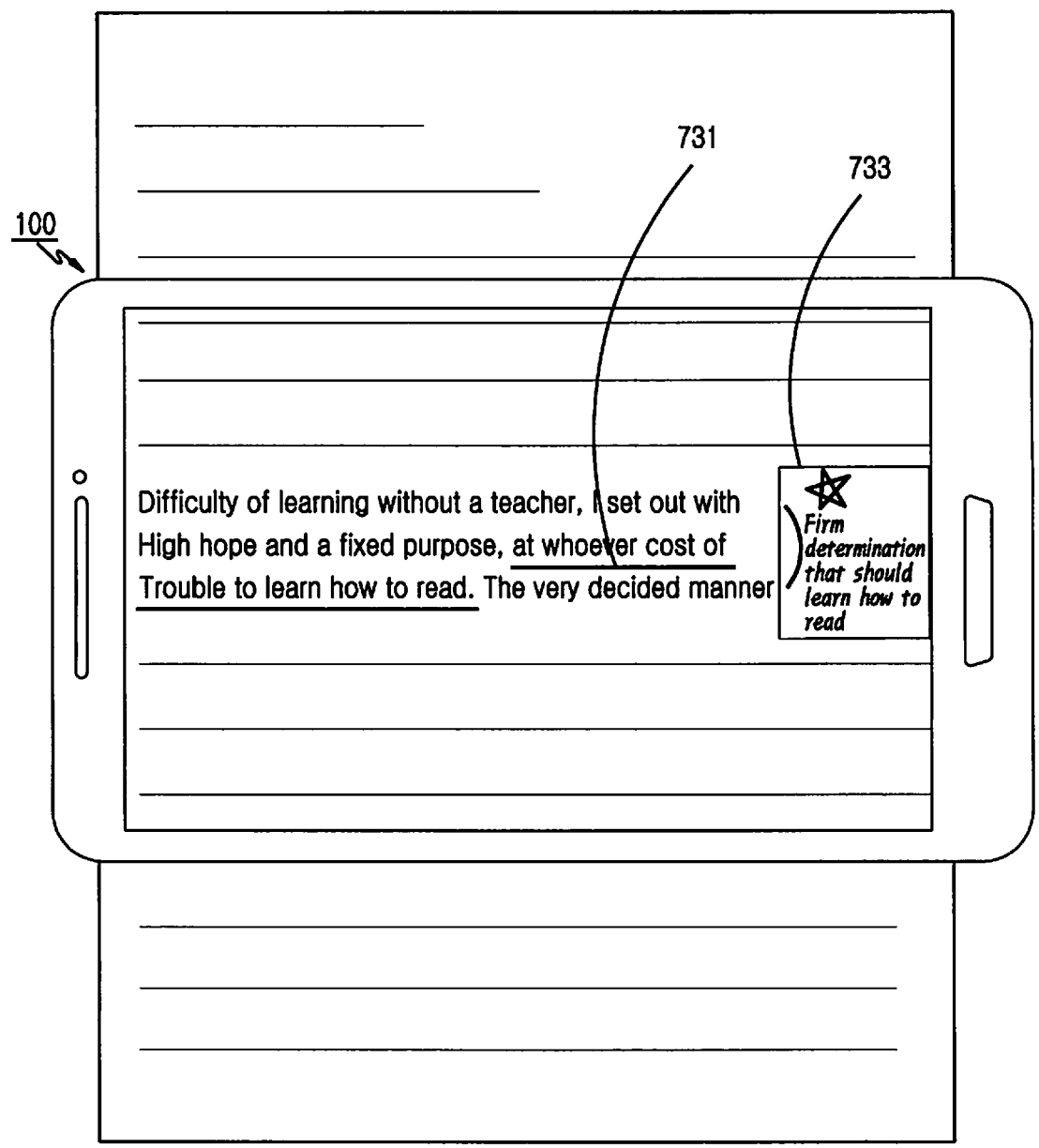

As shown in FIG. 7C, according to an embodiment of the present invention, the electronic device 100 may output a text in which handwriting is input to the digital document with at least one of various display methods. The electronic device 100 may set (reset) a method of outputting a text in which handwriting is input and that is output to the digital document.

According to an embodiment of the present invention, when the electronic device 100 selects 'save' 709 in a selection window shown in FIG. 7B(a), the electronic device 100 may display a digital document, as shown in FIG. 7C. Because the electronic device 100 cannot match at least one text to a digital text, the electronic device 100 may display a cropped image 733 and perform again operation of determining a character or a symbol of the cropped image 733 to a digital text.

When the electronic device 100 selects 'cancel' 729 in a selection window shown in FIG. 7B(b), the electronic device 100 may not display a determined digital text 'at whoever cost of trouble to learn how to read' 705 and 'firm determination that should learn how to read' 725. Even when the electronic device 100 determines a digital text matched to a text in which handwriting is input, the electronic device 100 may display a cropped image 733 in the digital document, as shown in FIG. 7C according to setting.

Figure 7D:
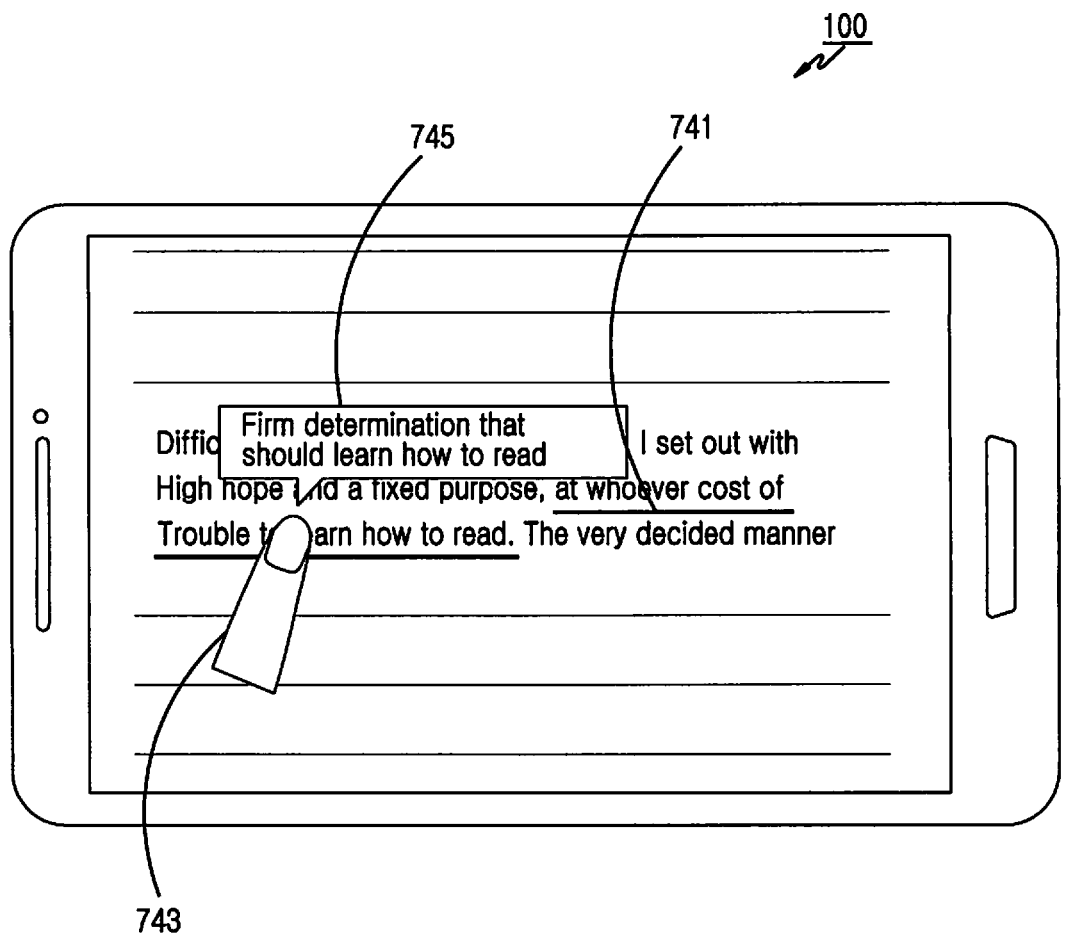

As shown in FIG. 7D, according to an embodiment of the present invention, in a method of displaying a text in which handwriting is input to acquired document information in the digital document, when the electronic device 100 selects a text area displayed in the digital document with an input means 743 (e.g., a finger or an electronic pen), the electronic device 100 may be set to display a connected text. According to an embodiment of the present invention, when determining a case of selecting with an input means, if touching a text area with the input means, the electronic device 100 may determine to use at least one method of cases of indirectly touching (e.g., hovering) with an input means.

According to an embodiment of the present invention, when displaying a digital document generated with acquired document information on the touch screen 133, the electronic device 100 may display a digital text determined with a text printed in a constant font. When including an area connected to a text in which handwriting is input in a displayed digital text, the electronic device 100 may display (e.g., an underline 741) that a connected text or connected data exists. According to an embodiment of the present invention, the underline 741 in which data exists may be displayed according to a function of a symbol that designates a range, described with reference to FIG. 7B. The electronic device 100 may display a predetermined function in the digital document through various methods of outputting a text in which handwriting is input such as a symbol that designates a range. According to an embodiment of the present invention, the electronic device 100 may change a color of a digital text with a method of distinguishing from a digital text displayed with an underline including another function, and may add various effects such as a method of differently displaying a form of the underline like two or three lines. The electronic device 100 may apply an effect according to a predetermined method.

According to an embodiment of the present invention, when selecting a digital text 731 to which other data is connected, the electronic device 100 may display the digital text 731 to which other data is connected in an area (e.g., a pop-up window) separate from a digital document that displays connected data 'firm determination that should learn how to read' 745. According to an embodiment of the present invention, when displaying connected data, the electronic device 100 may set to display an image (e.g., 733 of FIG. 7C) that crops a text input in handwriting in addition to a method of displaying the digital text 745 determined to a text input in handwriting.

Figure 7E:
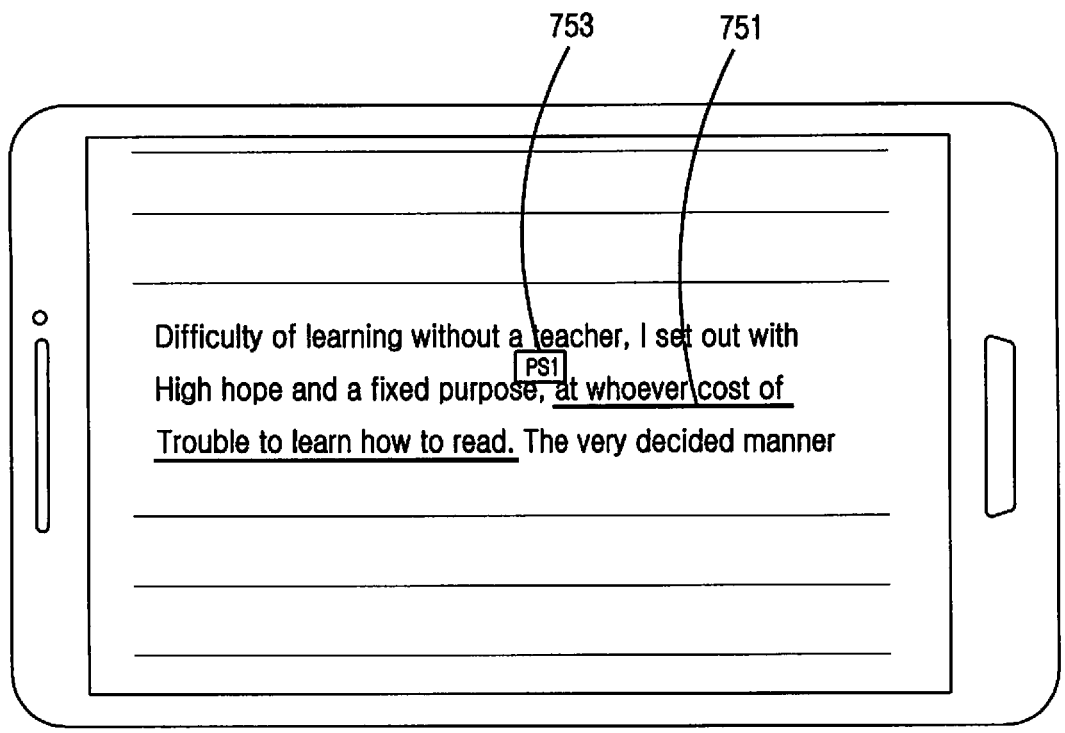

As shown in FIG. 7E, according to an embodiment of the present invention, in a method of displaying a text in which handwriting is input to acquired document information in the digital document, the electronic device 100 may display an object (e.g., an icon) that controls to display a text in which handwriting is input in a predetermined area of the digital document.

According to an embodiment of the present invention, the electronic device 100 may connect 'at whoever cost of trouble to learn how to read' 751 displayed in the digital document of the electronic device 100 to digital text data or a text (crop image) in which handwriting is input according to a predetermined symbol. The electronic device 100 may display an object 753 that may display connected digital text data or a text (crop image) in which handwriting is input at a predetermined position of the digital document. A predetermined position that displays the object 753 may be a position within a determined range of a periphery of 'at whoever cost of trouble to learn how to read' 751 in which digital text data in which the object 753 is connected or a text (crop image) input in handwriting is connected according to a predetermined symbol. When selecting the displayed object 753, the electronic device 100 may generate and display a text (crop image) input in handwriting or digital text data connected to the object in an area separate from the digital document, as shown in FIG. 7D. The electronic device 100 does not limit a position of the displayed object 753 to a position within a determined range of a periphery of 'at whoever cost of trouble to learn how to read 751' and may set the position of the displayed object 753 to a random position of the digital document.

Figure 8A:
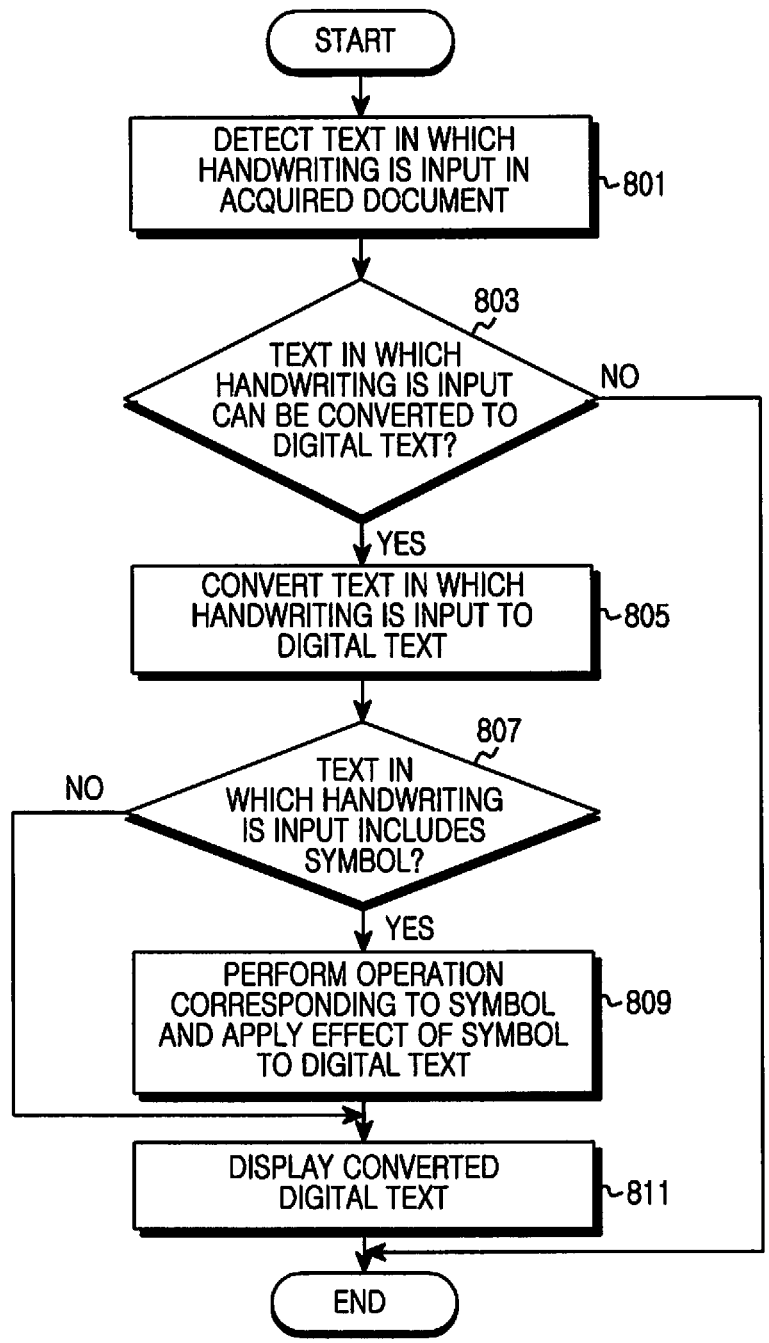
FIGS. 8A and 8B are flowcharts illustrating an operation of displaying document information that an electronic device acquires, according to an embodiment of the present invention.
Figure 8B:
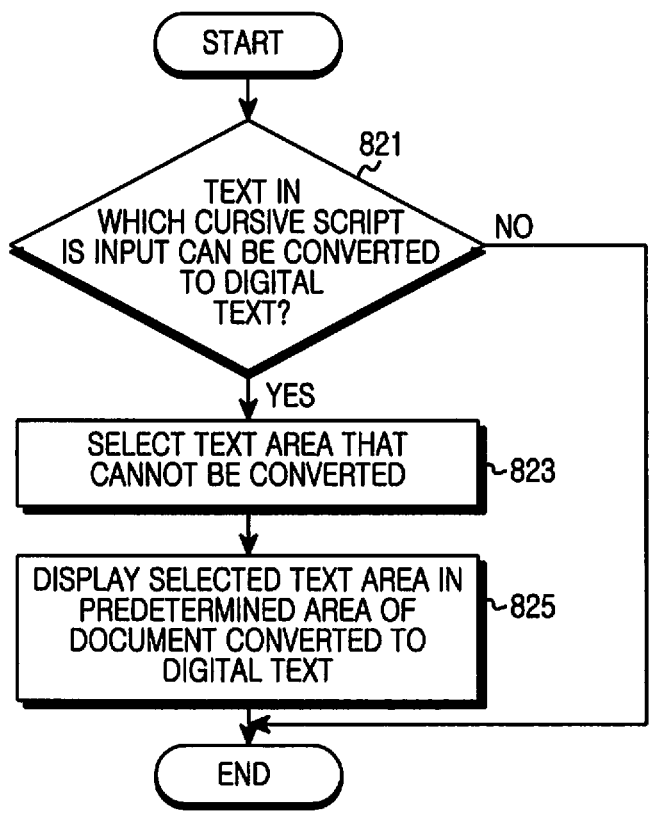

FIGS. 8A and 8B are flowcharts illustrating operation of displaying document information that an electronic device acquires, according to an embodiment of the present invention.

As shown in FIG. 8A, according to an embodiment of the present invention, the electronic device 100 may detect a text in which handwriting is input from image date of an acquired analog document, and determine a text in which handwriting is input to a matching digital text. When the text in which handwriting is input includes a symbol, the electronic device 100 may perform operation corresponding to the symbol, and display a digital document generated based on a text included in image data of the analog document.

The electronic device 100 photographs a document that displays the text through the image sensor 160, in step 801. The electronic device 100 may receive image data including the text through network communication, and document information acquired from image data previously stored at the memory 100 may include a text printed in a constant font and include a text in which handwriting is input. The electronic device 100 may detect a text displayed in the document through a text recognition and conversion program such as the OCR program 115 and/or the hand writing processing program 116.

The electronic device 100 determines whether a digital character is matched to text detected in a photographed document (acquired through direct photographing or that receives photographed image data) with reference to a database, in step 803. If at least one character of a word cannot be determined, or if at least one word of a sentence cannot be determined, the electronic device 100 may terminate operation of determining a corresponding word or a sentence to a digital text.

If the characters and words can be determined and the handwriting input can be converted to digital text, the electronic device 100 converts a text input in handwriting to a matching digital text, in step 805. The electronic device 100 may match various texts such as, for example, various types of characters (e.g., a circle character and a parenthesis character), a highlighter, an underline, a figure, and a character input with handwriting to the same text as or a text similar to that stored at a database.

The electronic device 100 may determine whether handwriting input includes a predetermined symbol, in step 807. If the handwriting input includes a predetermined symbol, when a digital symbol matched to the symbol is determined, the electronic device 100 may determine whether the digital symbol includes a predetermined function. If the digital symbol includes a predetermined function, the electronic device 100 performs an operation corresponding the symbol, in step 809. If the digital symbol does not include a predetermined function, the electronic device 100 may perform operation 811.

According to an embodiment of the present invention, when a symbol includes a function of determining a range of a text printed in a constant font, the electronic device 100 may determine a range of a printed text according to a function of a symbol input with handwriting. When displaying a determined range, the electronic device 100 may apply and display an effect such as an underline, a figure, and a contrast according to a function of a predetermined symbol. When including a function of connecting a determined range of a text in which a symbol is printed in acquired document information and a text, the electronic device 100 may process to display a printed text (e.g., a digital text matched to a printed text) of a determined range according to a function in which handwriting is input and a text in which handwriting is input (e.g., a digital text matched to a text input in handwriting) in a digital document according to a function of a symbol input with handwriting.

The electronic device 100 may display an image of an analog text included in the digital document and/or the digital text according to a predetermined function (811).

When displaying an analog text in which handwriting is input and that includes a character, a symbol, and a figure in an analog document, the electronic device 100 may display a digital document (e.g., FIG. 2B) in the same form as or a form similar to that of an analog document (e.g., FIG. 2A) including a text in which handwriting is input and a text printed according to a predetermined method at the memory 110.

According to an embodiment of the present invention, the electronic device 100 may determine a predetermined function of a figure or a symbol input with handwriting, apply the function to a printed text according to a predetermined function and a text in which handwriting is input, and display the text in the digital document. According to an embodiment of the present invention, when selecting a digital text of a determined range displayed in the digital document with a method of displaying in the digital document, a method of displaying an image that crops a connected digital text (e.g., a digital text matched to a text in which handwriting is input) or a text in which handwriting is input in a pop-up window may be used.

When the electronic device 100 performs operation 811, the electronic device 100 may terminate operation of the methodology of FIG. 8A.

Referring now to FIG. 8B, according to an embodiment of the present invention, the electronic device 100 may acquire image data including a text printed in a constant font or a text in which handwriting is input. The electronic device 100 may detect at least one text included in image data and determine a matched digital text. In step 821, it is determined whether handwritten text can be converted to digital text. When converting a detected text in which handwriting is input to a digital text, if at least one character of a word cannot be determined, or if at least one word of a sentence cannot be determined, the electronic device 100 may perform operation 823. When the electronic device 100 cannot determine a digital text matched to a text printed in a constant font or handwritten text, the electronic device 100 selects a text area that cannot be converted, in step 823. When the electronic device 100 can determine a digital text matched to a text printed in a constant font or handwritten text, the electronic device 100 may terminate operation of FIG. 8B. When the electronic device 100 can determine a digital text matched to a text printed in a constant font or handwritten text, the electronic device 100 may perform operation 805 of FIG. 8A.

When the electronic device 100 cannot determine a digital text matched to a text printed in a constant font or handwritten text, the electronic device 100 acquires image data corresponding to a text area in which of the text that cannot be converted to digital text. When acquiring image data corresponding to a text area that cannot be converted to digital text, the electronic device 100 may use a cropping method and acquired image data may not be limited to handwritten text. When the electronic device 100 does not determine a text printed in a constant font to a matched digital text, the electronic device 100 crops an image corresponding to a text area that is not converted.

The electronic device 100 displays a crop image of a text that is not converted to a digital text at a corresponding position of a text that is not determined of a generated digital document, in step 825. Operation of the electronic device 100 is not limited to operation of displaying at a corresponding position of a text that is not converted, and the electronic device 100 may provide a function of setting a displaying position and may provide a function of changing a position of a displayed image.

When the electronic device 100 performs step 825, the electronic device 100 may terminate operation of the methodology of FIG. 8B.

When the electronic device 100 does not determine a digital text matched to handwritten text, although it is described that an image corresponding to a text area in which handwriting is input that does not convert may be cropped, operation of the electronic device 100 is not limited thereto, and when a digital text matched to a printed text cannot be converted, the electronic device 100 may crop an image corresponding to a printed text area that is not converted and include the cropped image in a corresponding area of the digital document.

The electronic device 100 may convert and display a text included in a document included in the memory of the electronic device 100 as well as a document formed with a text and a digital text in which handwriting is input of an image that photographs through an image sensor to the digital document. The electronic device 100 may display a digital document corresponding to an entire area of FIG. 2B by combining a partial area of a document in which a converted digital text is printed and display a predetermined area of a generated digital document.

According to an embodiment of the present invention, the electronic device 100 may recognize a text in which handwriting is input to acquired document information, provide a digital document generated with operation corresponding to a character, figure, or a symbol input with handwriting and clearly provide a text in which handwriting is input and that is not recognized in the electronic device 100.

Various embodiments of the present invention may be performed through at least one program which the memory 110 of the electronic device 100 includes, and may be directly controlled by a processor. Further, various embodiments may be controlled through at least one control module which a processor controls.

Methods according to various embodiments of the present invention can be implemented in a form of hardware components, software components, or combinations thereof. When implemented by software components, a computer readable storage medium that stores at least one program (software module) may be provided. At least one program stored at a computer readable storage medium is formed to execute by at least one processor within the electronic device 100. At least one program may include an instruction that enables the electronic device 100 to execute a method, according to embodiments of the present invention.

Such a program (software module, software) may be stored at a non-volatile memory including a Random Access Memory (RAM) and a flash memory, a Read-Only Memory (ROM), an Electrically Erasable and Programmable ROM (EEPROM), a magnetic disk storage device, a Compact Disk ROM (CD-ROM), a Digital Versatile Disk (DVD), or an optical storage device of other form, and a magnetic cassette. Alternatively, the program may be stored at a memory formed with a combination of a portion or the entire thereof. Further, each constituent memory may be included in plural.

Further, the program may be stored at an attachable storage device that may access to the electronic device 100 through a communication network such as Internet, intranet, a Local Area Network (LAN), a Wireless LAN (WLAN), or a Storage Area Network (SAN), or a communication network formed with a combination thereof. Such a storage device can access to the electronic device 100 through an external port.

Further, a separate storage device on the communication network may provide access to a portable electronic device 100.

While the invention has been shown and described with reference to certain embodiments thereof, it will be understood by those skilled in the art that various changes in form and detail may be made therein without departing from the spirit and scope of the present invention as defined by the appended claims.

What is claimed is:

1. A method of an electronic device, the method comprising
displaying, via a display of the electronic device, an electronic document;
identifying, from the electronic document, a plurality of handwritten inputs distinguished from a plurality of text words included in the electronic document;
acquiring, from among the plurality of handwritten inputs, first handwritten symbols;
identifying, from the electronic document, at least one text word corresponding to each of the first handwritten symbols;
determining a type of the first handwritten symbols to be related to ordering;
determining an order of the first handwritten symbols based on an order of at least one character recognized from a handwritten input within each of the first handwritten symbols;
rearranging the first handwritten symbols based on the determined order;
receiving a user input; and
based on receiving the user input, displaying, via the display, the at least one text word as associated with first digital symbols corresponding to each of the first handwritten symbols, rearranged in the determined order of the first handwritten symbols,
wherein the plurality of handwritten inputs further include second handwritten symbols,
wherein the method further comprises:
acquiring, from among the plurality of handwritten inputs, the second handwritten symbols; and
identifying second digital symbols which are mapped to the acquired second handwritten symbols,
wherein the second handwritten symbols comprise a symbol designating a range for the at least one text word, and
wherein identifying the at least one text word comprises:
determining that each of the second handwritten symbols is located within a predetermined distance from each of the first handwritten symbols, and
based on determination that each of the second handwritten symbols is located within a predetermined distance from each of the first handwritten symbols, perform one of:
identifying the at least one text word located from a first start point to a first end point, wherein the first start point is indicated by each of the first handwritten symbols and the first end point is indicated by each of the second handwritten symbols, and
identifying the at least one text word located from a second start point to a second end point, wherein the second start point is indicated by each of the first handwritten symbols and the second end point is indicated by at least one punctuation mark that includes one of a period, a semicolon, and a comma.

2. The method of claim 1; wherein the at least one text word is associated with the plurality of text words included in the electronic document and at least one handwritten text word included in the plurality of handwritten inputs.

3. The method of claim 1, further comprising:
identifying the first digital symbols which are mapped to the acquired first handwritten symbols.

4. The method of claim 1, wherein a second user interface is superimposed on the first user interface.

5. The method of claim 1, further comprising:
determining that the at least one handwritten text word cannot be converted to at least one recognized text word;
based on determining that the at least one handwritten text word cannot be converted to at least one recognized text word, generating an image including the at least one handwritten text word; and
displaying the generated image.

6. An electronic device, comprising:
a display; and at least one processor coupled to the display, configured to:
 display, via the display, an electronic document;
 identify, from the electronic document, a plurality of handwritten inputs distinguished from a plurality of text words included in the electronic document;
 acquire, from among the plurality of handwritten inputs, first handwritten symbols;
 identify, from the electronic document, at least one text word corresponding to each of the first handwritten symbols;
 determine a type of the first handwritten symbols to be related to ordering;
 determine an order of the first handwritten symbols based on an order of at least one character recognized from a handwritten input within each of the first handwritten symbols;
 rearrange the first handwritten symbols based on the determined at least one of the type or the order; and
based on receiving a user input, display, via the display, the at least one text word as associated with first digital symbols corresponding to each of the first handwritten symbols, rearranged in the determined order of the first handwritten symbols,
wherein the plurality of handwritten inputs further include second handwritten symbols,
wherein the at least one processor is further configured to:
 acquire, from among the plurality of handwritten inputs, the second handwritten symbols; and
 identify second digital symbols which are mapped to the acquired second handwritten symbols,
wherein the second handwritten symbols comprise a symbol designating a range for the at least one text word, and
wherein the at least one processor is further configured to:
 if each of the second handwritten symbols is located within a predetermined distance from each of the first handwritten symbols, identify the at least one text word located from a first start point to a first end point, wherein the first start point is indicated by each of the first handwritten symbols and the first end point is indicated by each of the second handwritten symbols, and
 if each of the second handwritten symbols is beyond the predetermined distance from each of the first handwritten symbols, identify the at least one text word located from a second start point to a second end point, wherein the second start point is indicated by each of the first handwritten symbols and the second end point is indicated b at least one punctuation mark that includes one of a period, a semicolon, and a comma.

7. The electronic device of claim 6, wherein the at least one text word is associated with the plurality of text words included in the electronic document and at least one handwritten text word included in the plurality of handwritten inputs.

8. The electronic device of claim 6, wherein the at least one processor is further configured to:
 identify the first digital symbols which are mapped to the acquired first handwritten symbols.

9. The electronic device of claim 6, wherein a second user interface is superimposed on the first user interface.

10. The electronic device of claim 6, wherein the at least one processor is further configured to:
 generate, when the at least one handwritten text word cannot be converted to at least one recognized text word, an image including the at least one handwritten text word; and
 display the generated image.

* * * * *